US012746960B2

(12) United States Patent
Bowman et al.

(10) Patent No.: US 12,746,960 B2
(45) Date of Patent: Sep. 29, 2026

(54) WAGON WITH FOOTWELL AND HANDLE

(71) Applicant: VEER GEAR, LLC, Milton, GA (US)

(72) Inventors: Andrew Bowman, Milton, GA (US); Brady Schroeder, Milton, GA (US)

(73) Assignee: VEER GEAR, LLC, Milton, GA (US)

( * ) Notice: Subject to any disclaimer, the term of this patent is extended or adjusted under 35 U.S.C. 154(b) by 571 days.

(21) Appl. No.: 18/311,512

(22) Filed: May 3, 2023

(65) Prior Publication Data

US 2023/0294749 A1 Sep. 21, 2023

Related U.S. Application Data

(63) Continuation of application No. 17/456,072, filed on Nov. 22, 2021, now Pat. No. 11,760,399, which is a (Continued)

(51) Int. Cl.

| | |
|---|---|
| ***B62B 3/02*** | (2006.01) |
| ***B62B 3/14*** | (2006.01) |
| ***B62B 7/00*** | (2006.01) |
| ***B62B 7/12*** | (2006.01) |
| ***B62B 9/12*** | (2006.01) |
| *B62B 5/06* | (2006.01) |

(52) U.S. Cl.

CPC ................ *B62B 3/02* (2013.01); *B62B 3/144* (2013.01); *B62B 3/1468* (2013.01); *B62B 7/008* (2013.01); *B62B 7/12* (2013.01); *B62B 9/12* (2013.01); *B62B 5/067* (2013.01)

(58) Field of Classification Search

CPC ......... B62B 3/02; B62B 3/144; B62B 3/1468; B62B 7/008; B62B 9/12; B62B 5/067

See application file for complete search history.

(56) References Cited

U.S. PATENT DOCUMENTS 1,059,504 A 4/1913 Teppert
1,170,265 A 2/1916 Hudry
(Continued)

FOREIGN PATENT DOCUMENTS

CN 101177106 A 5/2008
CN 201161603 Y 12/2008
(Continued)

OTHER PUBLICATIONS

Chinese Office Action Corresponding to Application No. 201780016184.2, mailed May 27, 2025.
(Continued)

*Primary Examiner* — Marc Q Jimenez
*Assistant Examiner* — James J Triggs
(74) *Attorney, Agent, or Firm* — Harness, Dickey & Pierce, P.L.C.

(57) ABSTRACT

Consumer wagons are provided for carrying seated children and/or household cargo. In some embodiments, the wagons have a footwell for children carried in the wagon to place/rest their feet, and the footwell is repositionable between use position lowered relative to the wagon base and a collapsed/storage position closer to the wagon base. And in some embodiments, the wagons have a pull-handle that can be moved between different positions and that is lockable in multiple of the different positions.

36 Claims, 31 Drawing Sheets

Related U.S. Application Data continuation of application No. 16/686,454, filed on Nov. 18, 2019, now Pat. No. 11,198,460, which is a continuation of application No. 15/453,329, filed on Mar. 8, 2017, now Pat. No. 10,507,857.

(60) Provisional application No. 62/307,726, filed on Mar. 14, 2016, provisional application No. 62/305,017, filed on Mar. 8, 2016.

(56) References Cited

U.S. PATENT DOCUMENTS

| | | | | |
|---|---|---|---|---|
| 2,111,974 | A | 3/1938 | Kroll et al. | |
| 2,563,995 | A | 8/1951 | East | |
| 2,767,996 | A | 10/1956 | Seyforth | |
| 2,879,072 | A | 3/1959 | Rear et al. | |
| 4,116,465 | A | 9/1978 | Maclaren | |
| 4,597,116 | A | 7/1986 | Kassai | |
| 4,624,467 | A | 11/1986 | Burns | |
| 4,746,140 | A | 5/1988 | Kassai | |
| 4,768,806 | A | 9/1988 | Tetreault | |
| 4,775,068 | A | 10/1988 | Reiland et al. | |
| 4,811,968 | A | 3/1989 | Bolden | |
| 4,834,415 | A | 5/1989 | Yee | |
| 4,887,836 | A | 12/1989 | Simjian | |
| 5,056,805 | A | 10/1991 | Wang | |
| 5,333,893 | A | 8/1994 | Chen | |
| 5,360,222 | A | 11/1994 | Bro et al. | |
| 5,538,267 | A * | 7/1996 | Pasin | B62B 3/007 280/47.35 |
| 5,772,279 | A | 6/1998 | Johnson, Jr. | |
| 5,833,251 | A | 11/1998 | Peck | |
| 5,887,935 | A | 3/1999 | Sack | |
| 5,957,482 | A | 9/1999 | Shorter | |
| 6,053,515 | A | 4/2000 | Kelley | |
| 6,220,611 | B1 | 4/2001 | Shapiro | |
| 6,286,844 | B1 | 9/2001 | Cone, II et al. | |
| 6,641,149 | B2 | 11/2003 | Chiappetta et al. | |
| 6,733,026 | B1 | 5/2004 | Robberson et al. | |
| 6,845,991 | B1 | 1/2005 | Ritucci et al. | |
| 6,902,184 | B2 | 6/2005 | Hsu | |
| 6,916,028 | B2 | 7/2005 | Shapiro | |
| 6,932,365 | B2 | 8/2005 | Chiappetta et al. | |
| 6,962,370 | B2 | 11/2005 | Simpson | |
| 7,458,601 | B2 | 12/2008 | Miller et al. | |
| 7,462,009 | B2 * | 12/2008 | Hartmann | B62B 5/06 414/467 |
| 7,487,977 | B2 | 2/2009 | Johnson | |
| 7,523,955 | B2 | 4/2009 | Blair | |
| 7,866,686 | B2 | 1/2011 | Conaway et al. | |
| 7,992,882 | B2 | 8/2011 | Engelman | |
| 8,091,916 | B2 | 1/2012 | Shapiro | |
| 8,191,907 | B2 | 6/2012 | Watson | |
| 8,388,015 | B2 | 3/2013 | Chen | |
| 8,453,771 | B1 | 6/2013 | Hirschfeld | |
| 8,456,771 | B2 | 6/2013 | Weber et al. | |
| 8,622,404 | B2 | 1/2014 | Chen et al. | |
| 8,827,282 | B2 | 9/2014 | Schlegel et al. | |
| 8,851,505 | B2 | 10/2014 | Van Gelderen et al. | |
| 8,955,855 | B2 | 2/2015 | Herlitz et al. | |
| 8,955,869 | B2 | 2/2015 | Zehfuss | |
| 9,108,656 | B1 | 8/2015 | Nolan et al. | |
| 9,199,659 | B2 | 12/2015 | Chen et al. | |
| 9,327,749 | B2 | 5/2016 | Young et al. | |
| 9,333,977 | B2 | 5/2016 | Herlitz et al. | |
| 9,365,225 | B2 | 6/2016 | Henao | |
| 9,469,324 | B2 | 10/2016 | Bowman et al. | |
| 10,106,186 | B2 | 10/2018 | Choi | |
| 10,507,857 | B2 | 12/2019 | Bowman et al. | |
| 11,198,460 | B2 | 12/2021 | Bowman et al. | |
| 2002/0121753 | A1 | 9/2002 | Suzuki | |
| 2002/0140190 | A1 | 10/2002 | Shapiro | |
| 2003/0025301 | A1 | 2/2003 | Banuelos | |
| 2003/0071427 | A1 | 4/2003 | Simione | |
| 2003/0075903 | A1 | 4/2003 | Hsia | |
| 2003/0085552 | A1 | 5/2003 | Shapiro | |
| 2004/0232639 | A1 | 11/2004 | Chiappetta et al. | |
| 2005/0012307 | A1 | 1/2005 | Shapiro | |
| 2006/0213735 | A1 | 9/2006 | Weinstein et al. | |
| 2007/0152478 | A1 | 7/2007 | Siesholtz et al. | |
| 2007/0228697 | A1 | 10/2007 | Miller et al. | |
| 2007/0284900 | A1 | 12/2007 | Sze | |
| 2008/0174155 | A1 | 7/2008 | Engelman | |
| 2009/0033066 | A1 | 2/2009 | Saville et al. | |
| 2010/0109271 | A1 | 5/2010 | Funakura | |
| 2010/0156060 | A1 | 6/2010 | Dotsey et al. | |
| 2010/0156069 | A1 | 6/2010 | Chen | |
| 2010/0194065 | A1 | 8/2010 | Mountz et al. | |
| 2011/0025005 | A1 | 2/2011 | Howell | |
| 2011/0101649 | A1 | 5/2011 | Harding | |
| 2011/0169235 | A1 | 7/2011 | Moster | |
| 2011/0170948 | A1 | 7/2011 | Williams et al. | |
| 2011/0175332 | A1 | 7/2011 | Jones et al. | |
| 2012/0056452 | A1 | 3/2012 | Longenecker et al. | |
| 2012/0119457 | A1 | 5/2012 | Williams | |
| 2012/0235372 | A1 | 9/2012 | Herlitz et al. | |
| 2012/0261961 | A1 | 10/2012 | Heisey et al. | |
| 2014/0284902 | A1 | 9/2014 | Bar Noy | |
| 2014/0319884 | A1 | 10/2014 | Doucette et al. | |
| 2014/0353945 | A1 | 12/2014 | Young et al. | |
| 2015/0210307 | A1 | 7/2015 | Kalinin et al. | |
| 2016/0023674 | A1 | 1/2016 | Nolan et al. | |
| 2016/0031469 | A1 | 2/2016 | Bowman et al. | |
| 2017/0326019 | A1 | 11/2017 | Bramsiepe et al. | |
| 2017/0334474 | A1 | 11/2017 | Bowman et al. | |
| 2022/0073118 | A1 | 3/2022 | Bowman et al. | |

FOREIGN PATENT DOCUMENTS

| | | | |
|---|---|---|---|
| CN | 101397025 | A | 4/2009 |
| CN | 102050140 | A | 5/2011 |
| CN | 202641776 | U | 1/2013 |
| CN | 203832526 | U | 9/2014 |
| DE | 202006012430 | U1 | 10/2006 |
| EP | 1167157 | A1 | 1/2002 |
| EP | 1479590 | A2 | 11/2004 |
| GB | 2494897 | A | 3/2013 |
| KR | 101573235 | B1 | 12/2015 |
| NL | 2007020 | C2 | 1/2013 |
| WO | 2004002802 | A1 | 1/2004 |
| WO | 2015038373 | A1 | 3/2015 |
| WO | 2016018713 | A1 | 2/2016 |
| WO | 2018067450 | A1 | 4/2018 |

OTHER PUBLICATIONS

European Examination Report Corresponding to Application No. 22193213.0, mailed Jul. 11, 2025.

Chinese Notice on Reexamination Corresponding to Application No. 2017800161842, mailed Dec. 17, 2024.

European Office Action Corresponding to Application No. 221932130, mailed Dec. 20, 2024.

International Search Report and Written Opinion Corresponding to Application No. PCT/US2025/017822, mailed Jul. 9, 2025.

U.S. Appl. No. 17/456,072 , "Corrected Notice of Allowability", mailed Jun. 28, 2023, 7 pages.

European Application No. EP22193213.0 , Extended European Search Report, mailed on Mar. 6, 2023, 8 pages.

"Appendix to Joint Claim Construction and Pre-Hearing Statement", Dictionary Definitions, Litigation, Case No. 3:20-cv-00030, Jun. 27, 2022, 229 pages.

"Baby Jogger City Select Stroller: Baby", Amazon.com, 2014, pp. 1-8 pages.

"BOB Revolution Flex 3.0 Duallie Double Jogging Stroller", Strolleria, 2005, pp. 1-3 pages.

"Civil Cover Sheet", Cases: 3:20-Cv-00030-TMR Doc, Jan. 28, 2020, 2 pages.

"CLEVR Deluxe 3-in-1 Double 2 Seat Bike Trailer Stroller Jogger for Kids, Grey", eBay, Available Online at: https://www.ebay.com/i/373117421540, 2015, pp. 1-5.

(56) References Cited

OTHER PUBLICATIONS

"Complaint for Declaratory Judgement of Invalidity", Case: 3:20-cv-00030-TMR Doc, Jan. 27, 2020, 259 pages.
"Corrected Appendix to Joint Claim Construction and Pre-Hearing Statement", Dictionary Definitions, Litigation, Case No. 3:20-cv-00030, Jul. 5, 2022, 234 pages.
"Creative Outdoor Double Seat Folding Wagon", Page Vault, Available Online at: https ://www.overslock.com/S porls-T oys/Creative-Ouldoor -Double-Seat-FoldingWagon/ 9084665/product. html, 2014, 5 pages.
"Defendant Veer Gear LLC's Opening Claim Construction Brief Regarding U.S. Pat. No. 11,198,460", Case No. 3:20-cv-00030, Jul. 29, 2022, 123 pages.
"Defendant Veer Gear LLC's Opening Claim Constructions Brief", Litigation, Case No. 3:20-cv-00030-TMR Doc#, Apr. 13, 2021, 39 pages.
"Defendant Veer Gear LLC's Responsive Claim Construction Brief Regarding U.S. Pat. No. 11,198,460", Case No. 3:20-cv-00030, Aug. 26, 2022, 27 pages.
"Evenflo Company Inc.'s Amended Invalidity Contentions", Case No. 3:20-cv-00030, Apr. 4, 2022, 66 pages.
"Evenflo Company Inc.'s Answer to Veer Gear LLC's Supplemental CounterClaims for Patent Infringement", Case No. 3:20-cv-00030, Mar. 7, 2022, 16 pages.
"Evenflo Company, Inc.'s Opening Claim Construction Brief", Case No. 3:20-cv-00030, Jul. 29, 2022, 25 pages.
"Evenflo Company, Inc.'s Responsive Claim Construction Brief", Case No. 3:20-cv-00030, Aug. 26, 2022, 70 pages.
"Exhibit B1—Invalidity Chart—"Bramsiepe '6019"", U.S. Patent Publication No. 2017/0326019 titled "Mobile Walking and Transport Aid Device" to Hodger Bramsiepe and Guenter Kurt Rood, Nov. 16, 2017, 162 pages.
"Exhibit B10—Invalidity Chart—"Shapiro '028"", U.S. Pat. No. 6,916,028 titled "Collapsible Compact Carrier Device with Collapsible Wheel Construction" to Richard N. Shapiro, Jul. 12, 2005, 314 pages.
"Exhibit B11—Invalidity Chart—"Suzuki '1753"", U.S. Patent Publication No. 2002/0121753 titled Folder Stroller to Yoshiyuki Suzuki, Sep. 5, 2002, 125 pages.
"Exhibit B12—Invalidity Chart—"Wang '805"", U.S. Pat. No. 5,056,805 titled "Stroller" to Chia-Ho Wang, Oct. 15, 1991, 129 pages.
Exhibit B13—Invalidity Chart—"Yee '415", U.S. Pat. No. 4,834,415 titled "Dual-Seat Foldable Baby Cart" to Bruce Yee, May 30, 1989, 164 pages.
"Exhibit B14—Invalidity Chart—"Young '749"", U.S. Pat. No. 9,327,749 titled "Foldable Wagon" to Matthew E. Young, Randall A. Sandlin, Thomas K. Schlegel, and Cameron Eckert, May 3, 2016, 220 pages.
"Exhibit B15—Invalidity Chart with Combination Citations", 215 pages.
"Exhibit B2—Invalidity Chart—"Chen '6069"", U.S. Patent Publication No. 2010/0156069 A1 titled "Wagon with Seats" to Zhaosheng Chen, Jun. 24, 2010, 326 pages.
"Exhibit B3—Invalidity Chart—"Choi ' 186"", U.S. Pat. No. 10,106,186 titled "Baby Wagon with Improved Ease of Use" to Yejin Choi, Oct. 23, 2018, 198 pages.
"Exhibit B4—Invalidity Chart—"Dotsey '6060"", U.S. Patent Publication No. 2010/0156060 titled "Reversible Stroller Handle" to Michael A. Dotsey, et al., Jun. 24, 2010, 127 pages.
"Exhibit B5—Invalidity Chart—"Funakura '9271"", U.S. Patent Publication No. 2010/0109271 titled "Stroller" to Funakura, May 6, 2010, 174 pages.
"Exhibit B6—Invalidity Chart—"Henao '225"", U.S. Pat. No. 9,365,225 titled "Transformative Hand Cart" to Elvis Henao, Jun. 14, 2016, 330 pages.
"Exhibit B7—Invalidity Chart—"Kassai '140"", U.S. Pat. No. 4,746,140 titled "Baby Carriage" to Kenzou Kassai, May 24, 1988, 221 pages.
"Exhibit B8—Invalidity Chart—"MacLaren '465"", U.S. Pat. No. 4,116,465 titled "Baby Carriages" to Owen F. Maclaren, Sep. 26, 1978, 183 pages.
"Exhibit B9—Invalidity Chart—"Nolan '656"", U.S. Pat. No. 9,108,656 titled "Collapsible Wagon" to Patrick Nolan, Mike Dotsey, Noah Dingler, and Brady Schroeder, Aug. 18, 2015, 199 pages.
"Fisher-Price Kid Utility Vehicle", Amazon.com, 2006, 10 pages.
"Joint Claim Construction and Prehearing Statement Pursuant to S.D. Ohio Pat. R. 105.2 (d)", Litigation, Case No. 3:20-cv-00030, May 27, 2022, 15 pages.
"Joint Claim Construction and Prehearing Statement Pursuant to S.D. Ohio Pat. R. 105.2 (D)", Litigation—Joint Claim, Case No. 3:20-cv-00030, Jan. 28, 2021, 34 pages.
"Litigation—Evenflo Company Inc's Answer to Vear Geer LLC's Counterclaim for Patent Infringement and Counterclaim for Declaratory Judgement of Invalidity", Case: 3:20-cv-00030-TMR Doc, May 19, 2020, 25 pages.
"Litigation—Plaintiff Evenflo Company, Inc.'s S.D. Ohio Pat. R. 103.4 Disclosure of Amended Invalidity Contentions", Case No. 3:20-cv-00030, Oct. 7, 2021, 194 pages.
"Litigation—Plaintiff Evenflo Company, Inc.'s S.D. Ohio Pat. R. 103.4 Disclosure of Invalidity Contentions", Case No. 3:2Ckv-00030, Oct. 26, 2020, 150 pages.
"Infantastic FAH17 Mustard Gold Bicycle Trailer", Amazon.co.uk: Baby, 2012, pp. 1-5 pages.
"Memorandum and Opinion", Case No. 3:20-cv-00030, Nov. 28, 2022, 19 pages.
"Memorandum Opinion", Case: 3:20-cv-00030-TMR Doc, Aug. 24, 2021, 20 pages.
"Morgan Cycle Coach Kids Wagon", Walmart.com, Available Online at: https://www.walmart.com/ip/Morgan-Cycle-Coach-Kids-Wagon/17397655, 2011, pp. 1-6 pages.
"Motion for Partial Reconsideration by Defendant", Case No. 3:20-cv-00030, Dec. 6, 2022, 6 pages.
"Peg Perego Duette Piroet in Atmosphere", Page Vault, 2009, 7 pages.
"Plaintiff/Counterclaim Defendant Evenflo Company, Inc.'s. S.D. Ohio Pat. R. 105.4(a) Opening Claim Construction Brief", Case No. 3:20-cv-00030-TMR Doc#25, Apr. 13, 2021, 22 pages.
"Radio Flyer 3 in 1 EZ Fold Wagon with Canopy—Red: Target", Available Online at: https ://www. target. com/p/rad io-flyer-3-in-1-ez-fold-wagon-with-canopy-red/-/A-529957 46#1nk=sametab, 2014, 8 pages.
"Special Tomato Jogger Push Chair", Needs All-Terrain Stroller, 2014, pp. 1-7 pages.
"Step2 Neighborhood Wagon with Seats", Amazon.com, Available Online at: https://www.amazon.com/Step2-Neighborhood-Wagon-with-Seats/dp/BOO 1 JT AZPG, Accessed from Internet on Jan. 31, 2022, pp. 1-9 pages.
"Tag-Along Kids Bike Trailer Bicycle Pram Stroller Children Jogger Green", Buy Bike Trailers, Mydeal, Available Online at: https://www.mydeal.com .au/kids-all-weather-canopy-bike-trailer-jogger-green, Feb. 2016, pp. 1-5 pages.
"Transcript of Proceedings, Claim Construction Hearing", Case No. 3:20-cv-00030, Oct. 6, 2022, 87 pages.
"Two Seat Wagon", Bekhic, Available Online at: https ://www. amazon.com/Bekhic-Two-Seat-Wagon/dp/BOOJ 5P 1 ALE/ref=cm_cr_arp_d_product_top?ie=UTF8, 2014, 9 pages.
"Veer Gear LLC's Answer to Evenflo Company Inc.'s Complaint for Declaratory Judgment of Invalidity and Supplemental CounterClaims for Patent Infringement", Case No. 3:20-cv-00030, Feb. 15, 2022, 32 pages.
"Veer Gear LLC's Answer to Evenflo Company Inc's Counterclaim for Declaration Judgement of Invalidity of U.S. Pat. No. 10,597,058", Case: 3:20-cv-00030-TMR, Jun. 8, 2020, 4 pages.
"Veer Gear's Reply in Support of Opening Claim Construction Brief", Litigation—Defendant, United States District Court for the Southern District of Ohio Western Division, May 27, 2021, 26 pages.
U.S. Appl. No. 15/453,329 , Non-Final Office Action, Mailed on Jan. 22, 2019, 7 pages.
U.S. Appl. No. 15/453,329 , Non-Final Office Action, Mailed on Jun. 28, 2018, 7 pages.

(56) References Cited

OTHER PUBLICATIONS

U.S. Appl. No. 15/453,329 , Non-Final Office Action, Mailed on Sep. 20, 2017, 7 pages.
U.S. Appl. No. 15/453,329 , Notice of Allowance, Mailed on Jul. 25, 2019, 10 pages.
U.S. Appl. No. 16/686,454 , Final Office Action, Mailed on Jul. 22, 2020, 16 pages.
U.S. Appl. No. 16/686,454 , Non-Final Office Action, Mailed on Dec. 20, 2019, 10 pages.
U.S. Appl. No. 16/686,454 , Non-Final Office Action, Mailed on Aug. 30, 2021, 11 pages.
U.S. Appl. No. 16/686,454 , Non-Final Office Action, Mailed on Feb. 17, 2021, 9 pages.
U.S. Appl. No. 16/686,454 , Notice of Allowance, Mailed on Nov. 5, 2021, 9 pages.
U.S. Appl. No. 17/456,072 , "Corrected Notice of Allowability", Apr. 27, 2023, 7 pages.
U.S. Appl. No. 17/456,072 , "Corrected Notice of Allowability", May 24, 2023, 7 pages.
U.S. Appl. No. 17/456,072 , Non-Final Office Action, Mailed on Nov. 7, 2022, 17 pages.
U.S. Appl. No. 17/456,072 , Notice of Allowance, Mailed on Apr. 17, 2023, 9 pages.
Boorman et al., "The Design and Fabrication of an Upright Collapsible Transport System for Pushing Children", Collapsible Kid Cruiser, ASEE 2014 Zone I Conference, Apr. 3-5, 2014, 8 pages.
Chinese Application No. CN201780016184.2 , Office Action, Mailed on Jan. 7, 2022, 11 pages.
Chinese Application No. CN201780016184.2 , Office Action, Mailed on May 7, 2020, 11 pages.
Chinese Application No. CN201780016184.2 , Office Action, Mailed on Feb. 1, 2021, 13 pages.
Chinese Application No. CN201780016184.2 , Office Action, Mailed on Jun. 16, 2021, 9 pages.
European Application No. EP17763992.9 , Extended European Search Report, Mailed on Nov. 11, 2019, 8 pages.
European Application No. EP17763992.9 , Office Action, Mailed on Nov. 11, 2021, 5 pages.
LACKEY , "EROVR—A Transformable Dolly, Wagon, & Cart", CineD, Apr. 11, 2016, pp. 1-12.
PCT Application No. PCT/US2014/053780 , International Search Report and Written Opinion, Mailed on Feb. 6, 2015, 11 pages.
PCT Application No. PCT/US2015/041743 , International Search Report and Written Opinion, Mailed on Oct. 9, 2015, 9 pages.
PCT Application No. PCT/US2017/021342 , International Preliminary Report on Patentability, Mailed on Sep. 20, 2018, 6 pages.
PCT Application No. PCT/US2017/021342 , International Search Report and Written Opinion, Mailed on May 25, 2017, 8 pages.
PCT Application No. PCT/US2017/054739 , International Search Report and Written Opinion, Mailed on Dec. 15, 2017, 14 pages.
Schroeder , "Standard Consumer Safety Performance Specification for Carriages and Strollers", ASTM, Designation: F833-15, Feb. 13, 2016, pp. 1-23.
U.S. Appl. No. 62/307,726, Appendix to Joint Claim Construction and Pre-Hearing Statement, Litigation, Case No. 3:20-cv-00030, Jun. 27, 2022, 44 pages.
U.S. Appl. No. 62/305,017, Appendix to Joint Claim Construction and Pre-Hearing Statement, Litigation, Case No. 3:20-cv-00030, Jun. 27, 2022, 39 pages.
European Examination Report Corresponding to Application No. 22193213.0, mailed Mar. 9, 2026.
Defendant Memm, LLC d/b/a Bombi Gear'a Answer to Veer Gear LLC's Complaint fo Patent Infringement, Case No. 1:26-cv-00285-MSM-PAS (Dist. Rhode Island) (Jun. 29, 2026).

* cited by examiner

Section 7–7

Section 8–8

Section 31-31

Section 32-32

WAGON WITH FOOTWELL AND HANDLE

CROSS-REFERENCE TO RELATED APPLICATION

This application is a continuation of U.S. application Ser. No. 17/456,072, filed Nov. 22, 2021, which is a continuation of U.S. application Ser.

No. 16/686,454, filed Nov. 18. 2019, which is a continuation of U.S. application Ser. No. 15/453,329, filed Mar. 8, 2017, which claims the priority benefit of U.S. Provisional Patent Application Ser. No. 62/307,726, filed Mar. 14, 2016, and U.S. Provisional Patent Application Ser. No. 62/305,017, filed Mar. 8, 2016, each of which are hereby incorporated herein by reference.

TECHNICAL FIELD

The present invention relates generally to consumer-use wagons, and particularly to pull-handle wagons for multi-purpose use including carrying seated children and/or household cargo.

BACKGROUND

Conventional consumer-use wagons are commonly used for holding and carrying cargo such as children, their toys, beach items (e.g., chairs, towels, and sand buckets/shovels), and sports equipment (e.g., balls, bats, and helmets). Such wagons typically include a generally rectangular base and four generally rectangular upright walls forming an open-topped container, with a pull handle pivotally coupled to the base front, and with four wheels rotationally mounted to the base bottom. A traditional and well-known wagon of this type is the classic RADIO FLYER wagon.

While these wagons have their advantages, they also have some drawbacks. Accordingly, needs exist for improved features for consumer-use wagons for multi-purpose use. It is to the provision of solutions to these and other problems that the present invention is primarily directed.

SUMMARY

Generally described, the present invention relates to consumer-use wagons for multi-purpose use including carrying seated children and/or household cargo. In some embodiments, the wagons have a footwell for children carried in the wagon to place/rest their feet, and the footwell is repositionable between an extended/use position lowered relative to the wagon base and a collapsed/storage position closer to the wagon base. And in some embodiments, the wagons have a pull-handle that can be moved between different positions and that is lockable in multiple of the different positions.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

Generally described, the present invention relates to a consumer-use wagon that includes a base and a peripheral wall arrangement that together form a container, and that additionally includes a collapsible footwell, a position-locking handle, or both. It will be understood that the specific dimensions and proportions identified herein are representative for illustration purposes only, and are not limiting of the invention; in fact the invention expressly contemplates and covers many other embodiments with different dimensions, proportions, assembly methods, and overall designs.

The collapsible footwell includes a footrest that is positionable between an extended/use position lowered relative to the base and a collapsed/storage position closer to the base to provide a compact profile/arrangement to reduce the occupied footwell volume for storage and/or transport purposes. In the collapsed/storage position, the vacated space where the footwell was in the extended/use position effectively reduces the height dimension of the wagon with the wheels displaced (e.g., removed or folded to adjacent the base) to provide a smaller size for transportation and storage, for example during shipping from the manufacturer and/or the retailer, during storage in a user's garage, and/or during transport in a user's personal vehicle. The overall height of the wagon, with the wheels displaced and the upright walls folded down, is thus significantly reduced, thereby significantly reducing its package size for shipment from the manufacturer and/or retailer, and thereby significantly reducing shipping costs.

Figure 1:
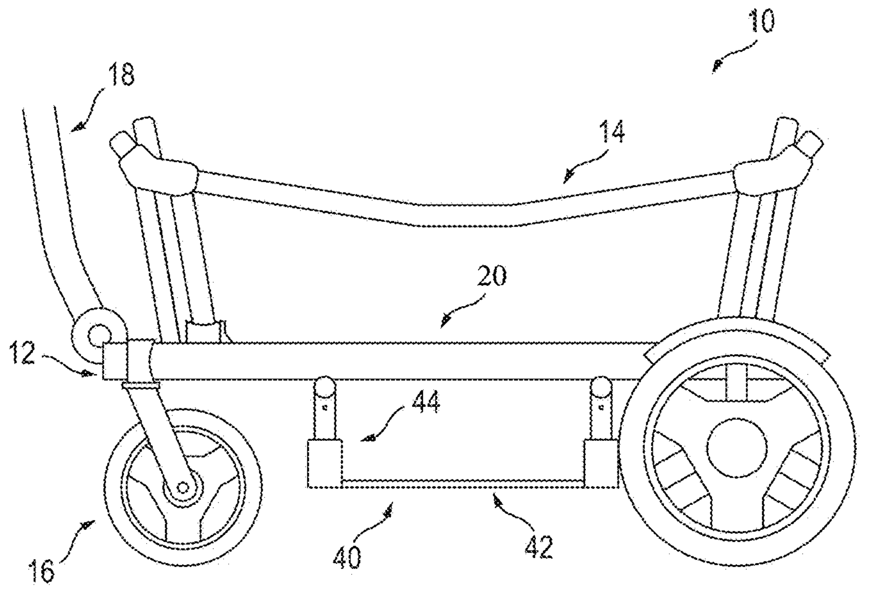
FIGS. 1-17 show a wagon with a collapsible footwell feature according to a first example embodiment of the invention.
Figure 2:
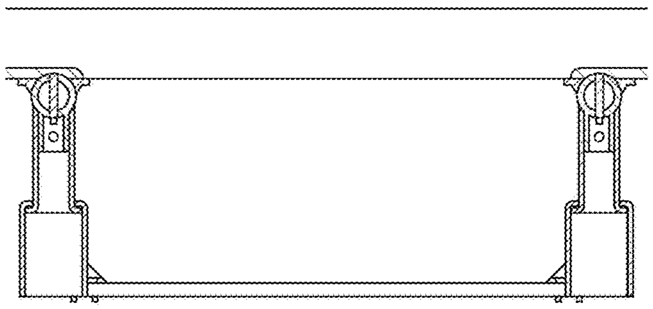
Figure 3:
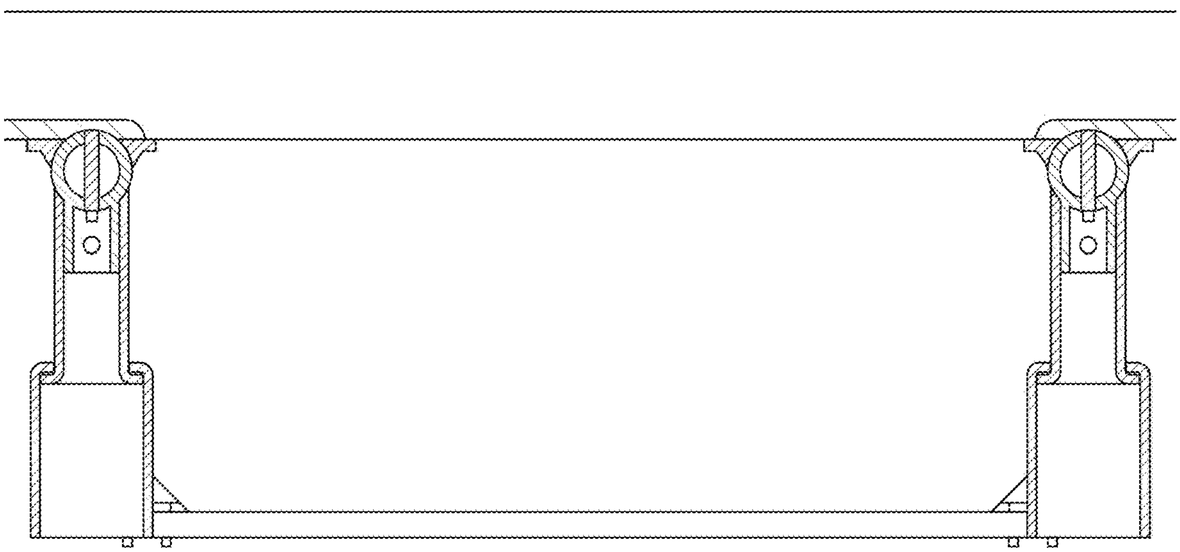
Figure 4:
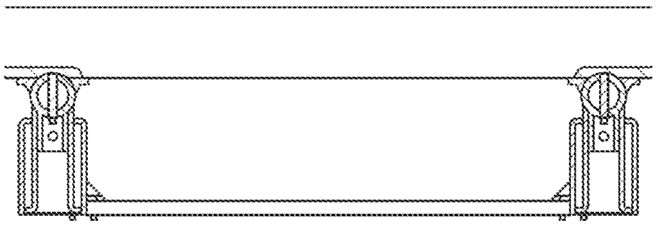
Figure 5:
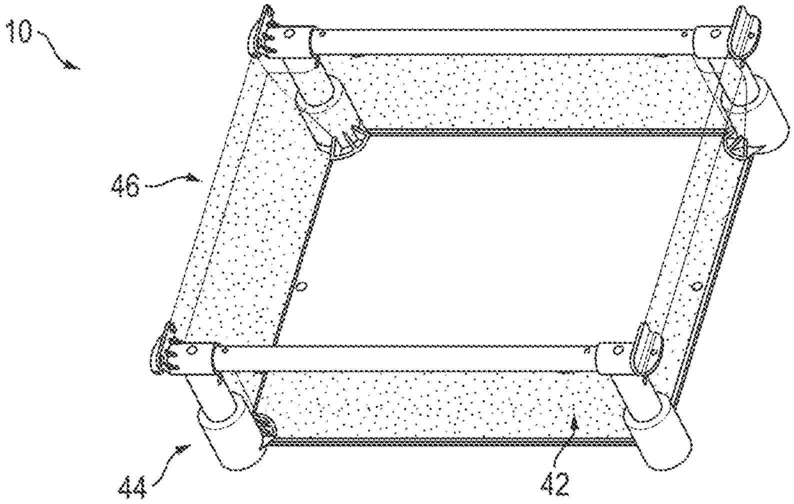
Figure 6:
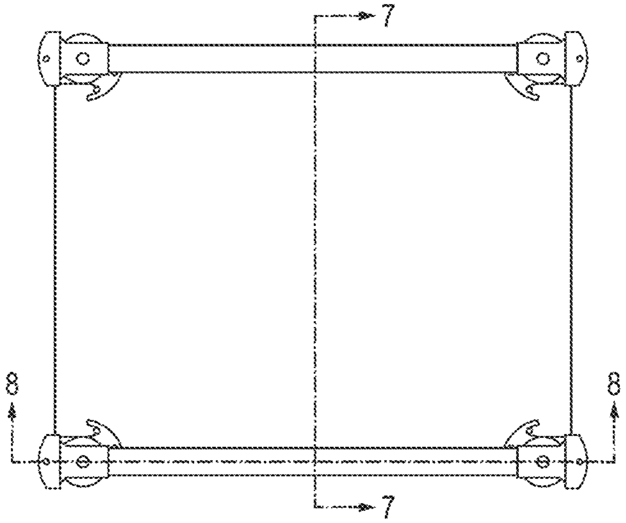
Figure 7:
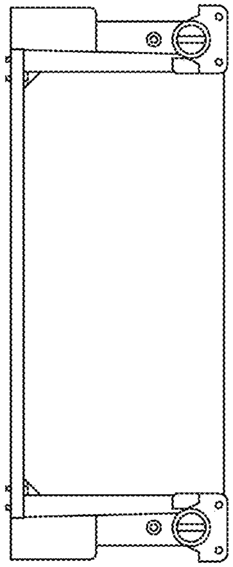
Figure 8:
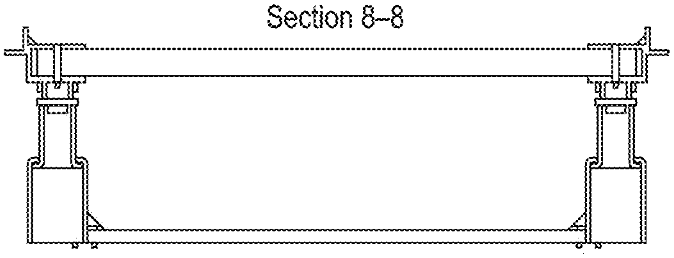
Figure 9:
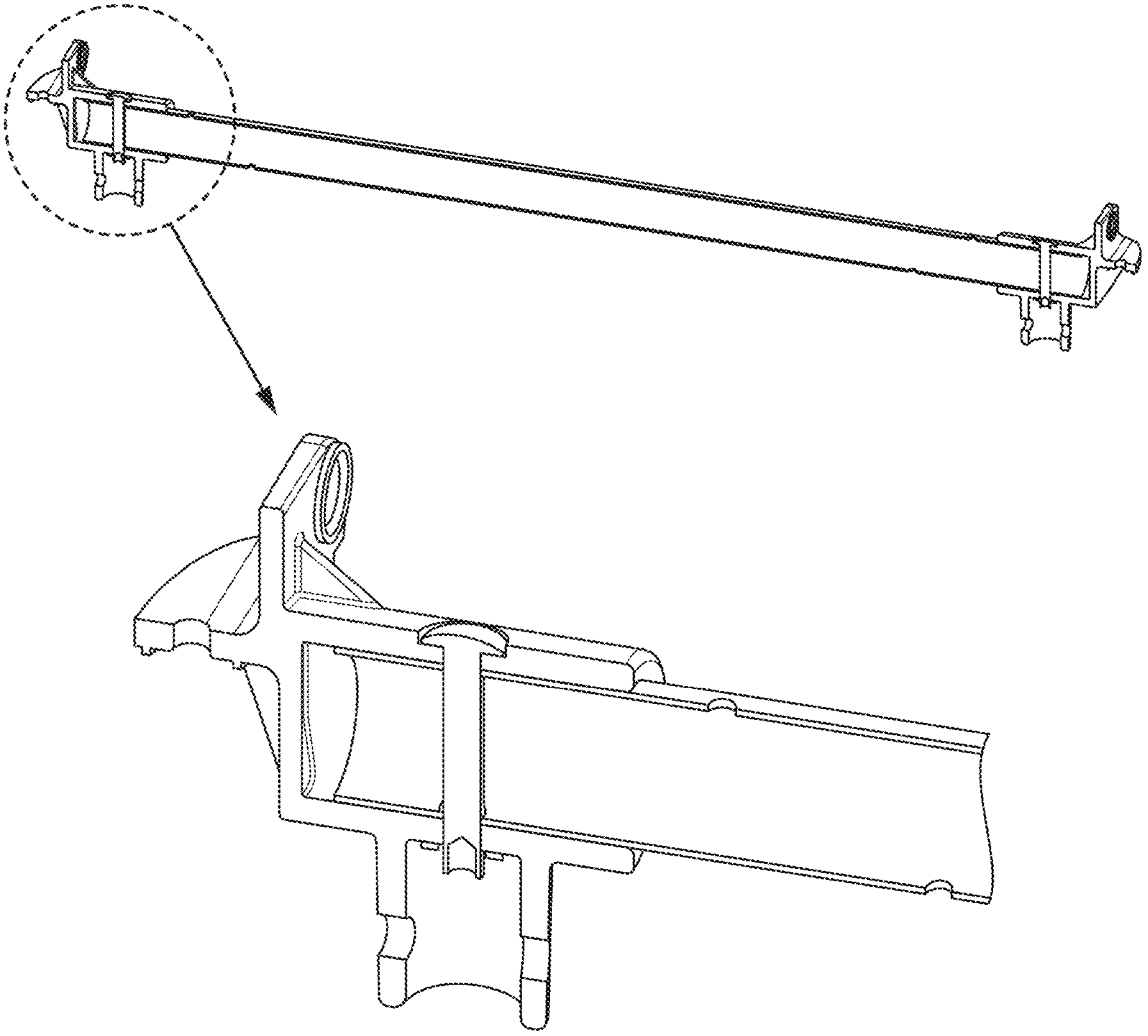
Figure 10:
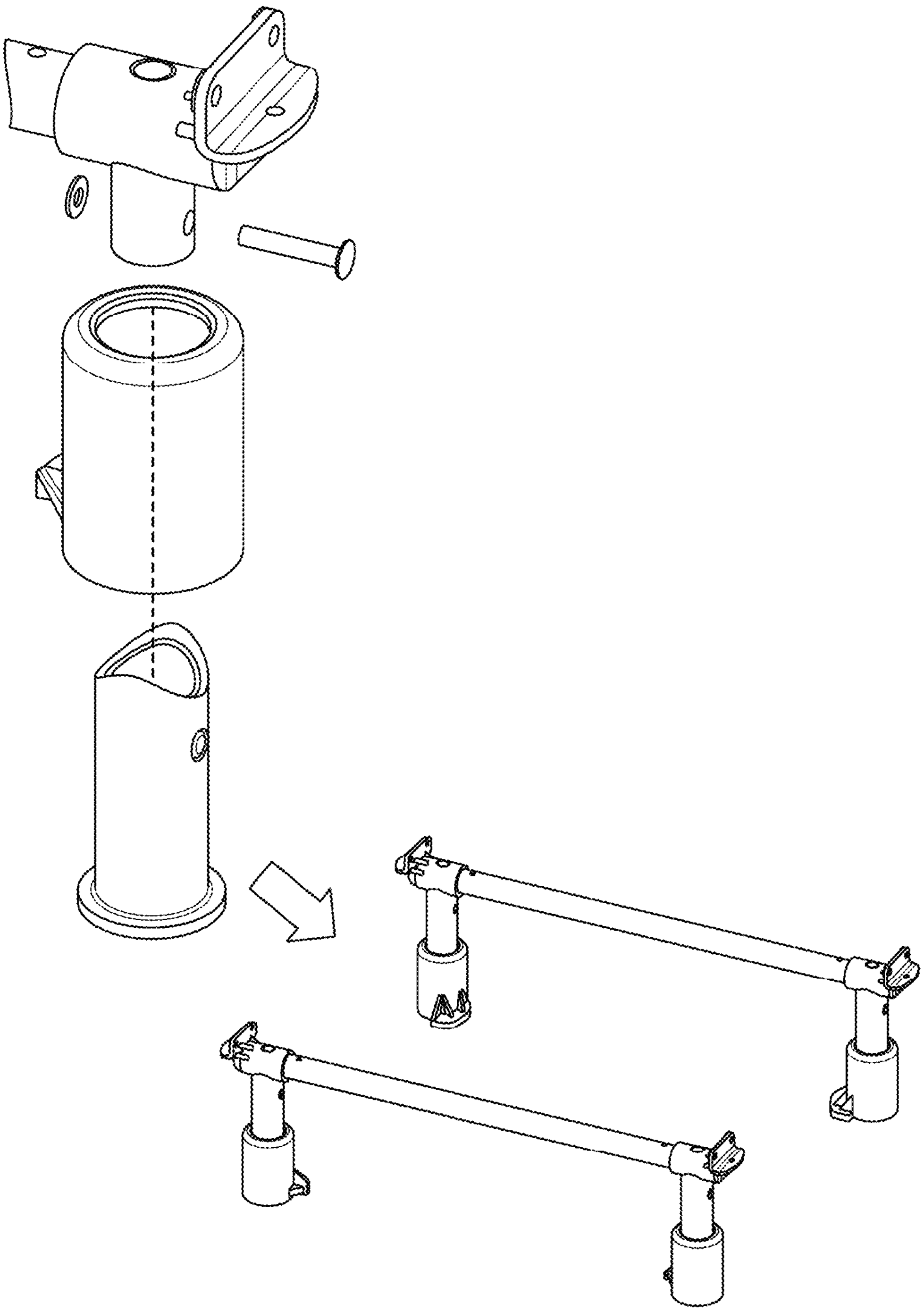
Figure 11:
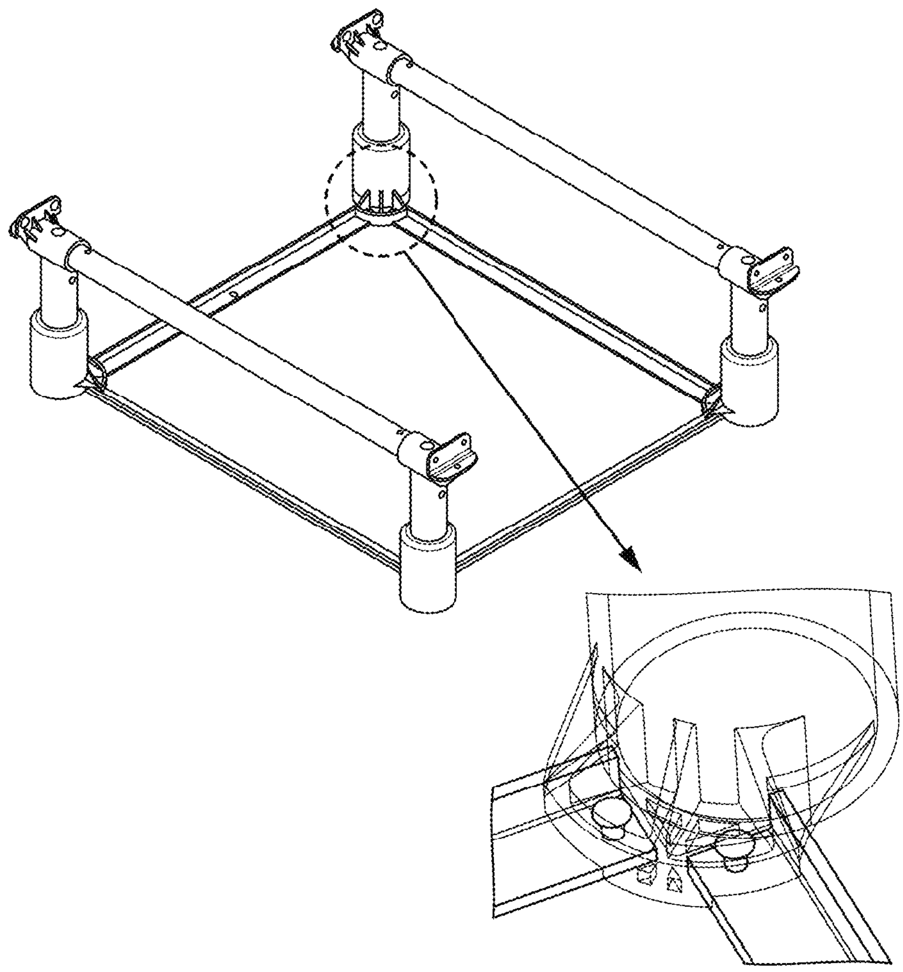
Figure 12:
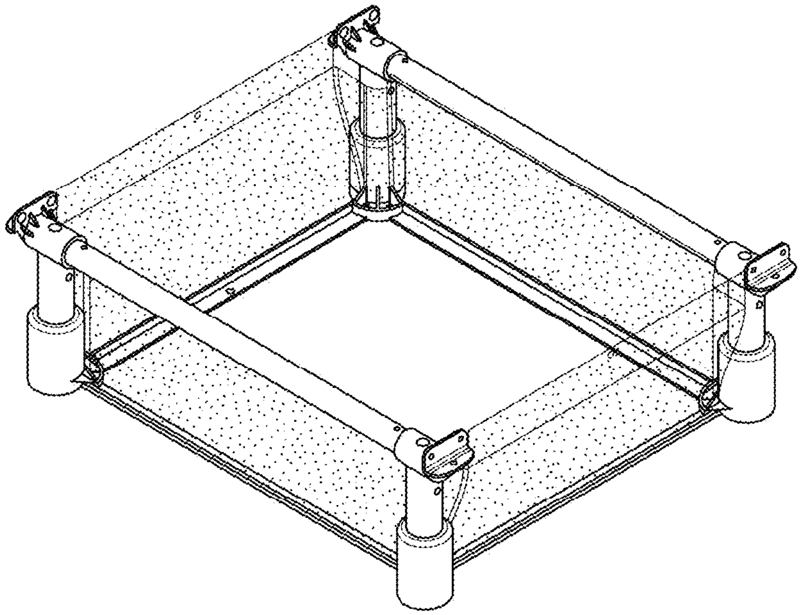
Figure 13:
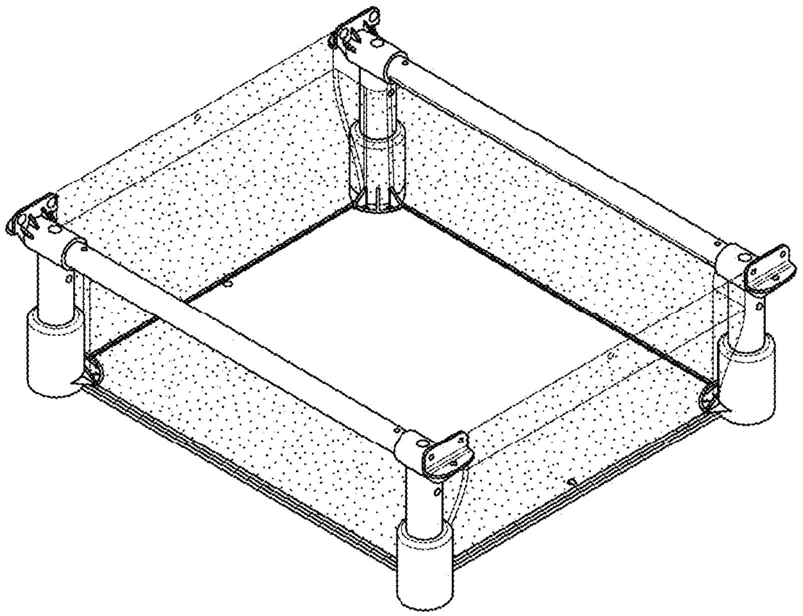
Figure 14:
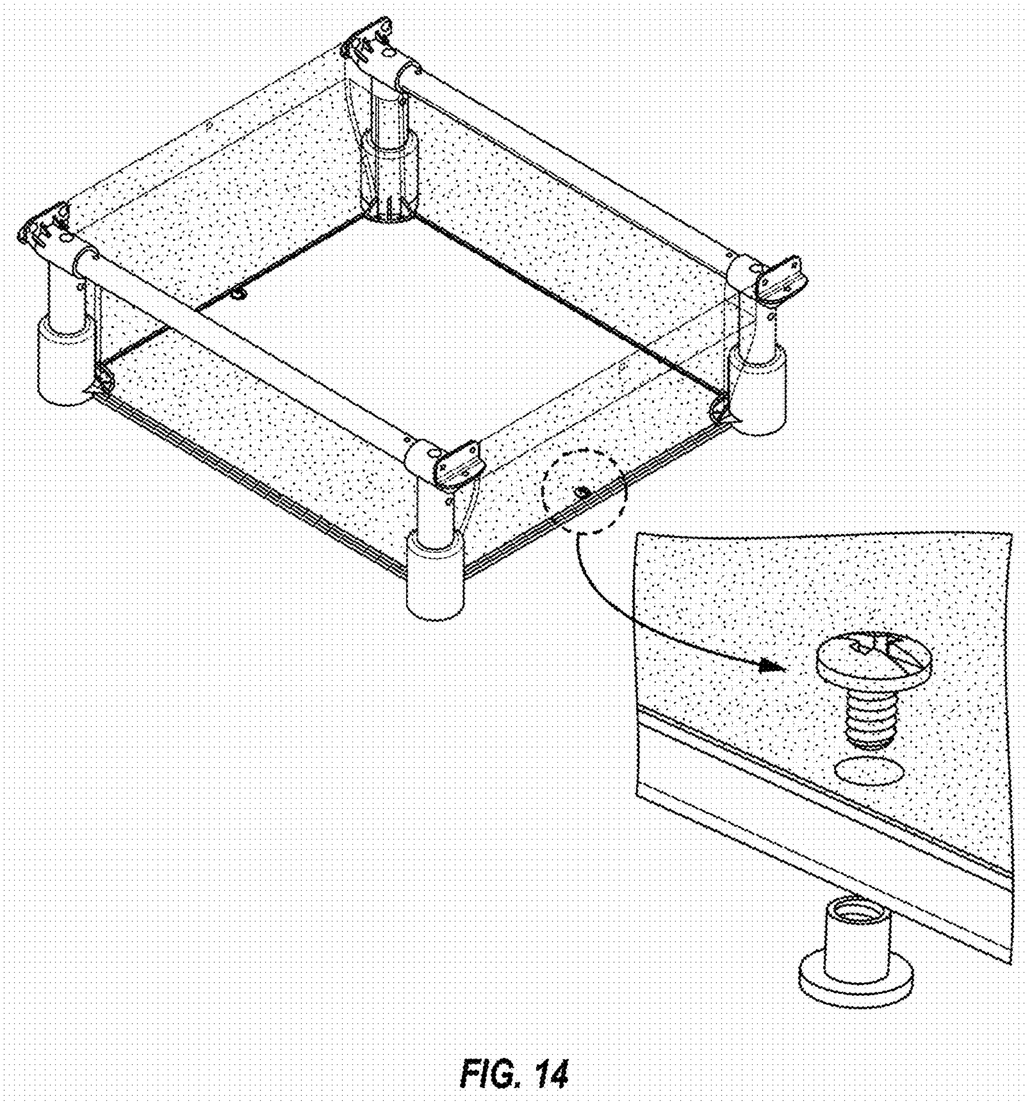
Figure 15:
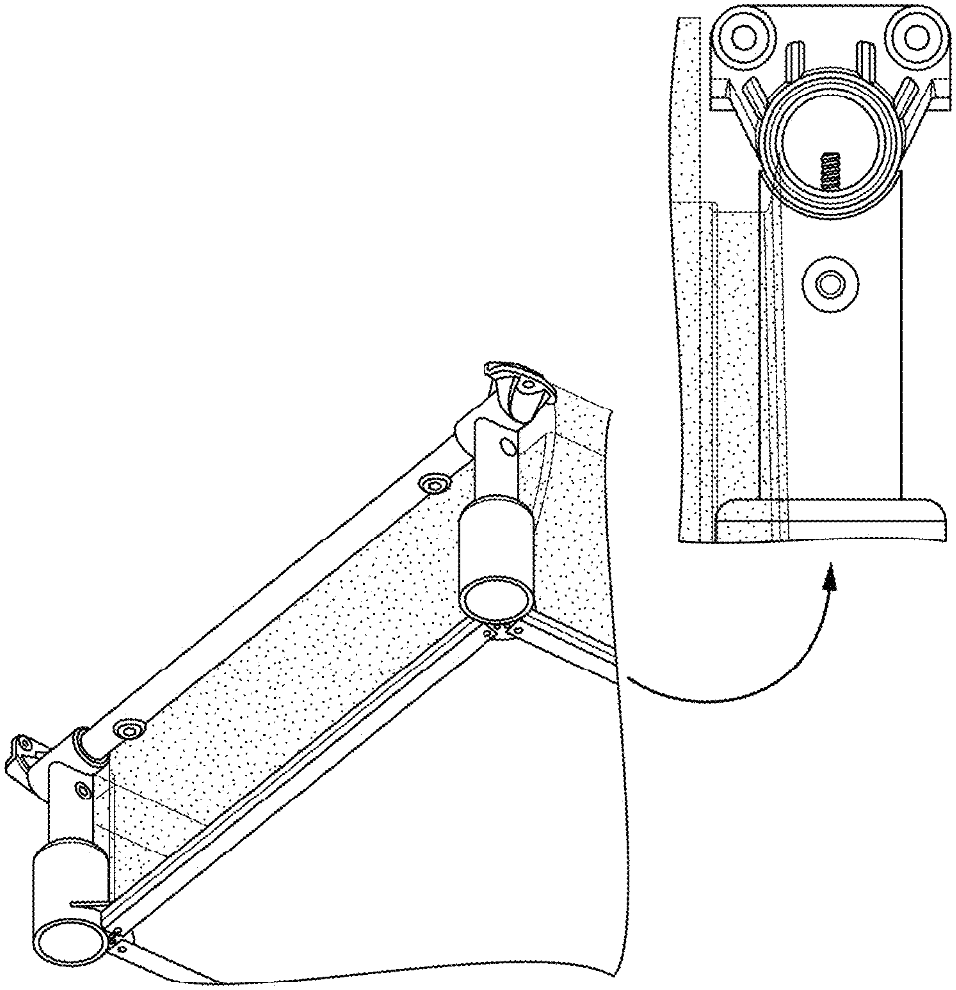
Figure 16A:
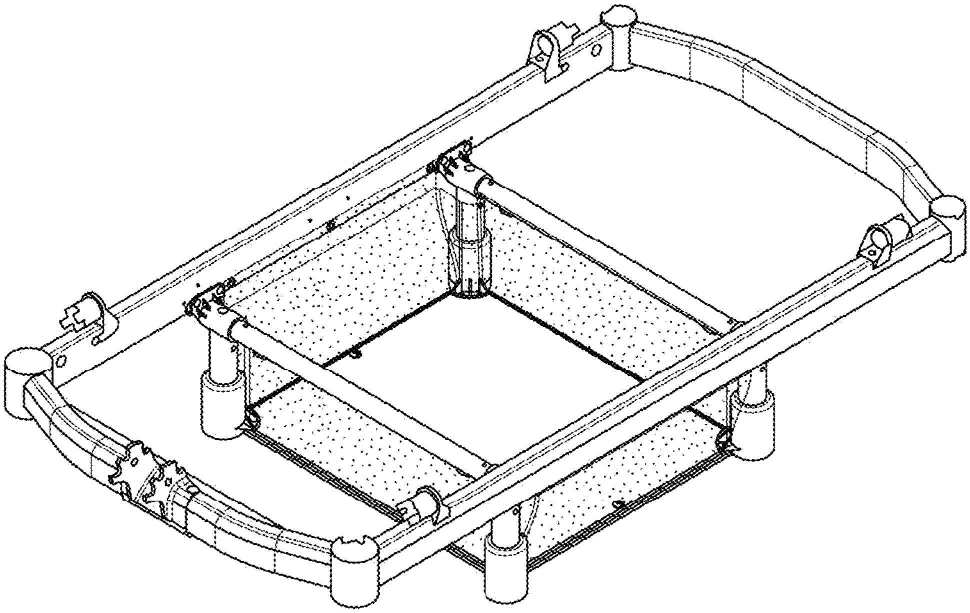
Figure 16B:
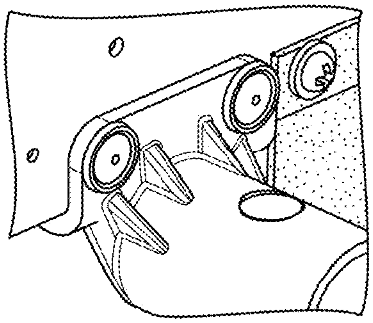
Figure 16C:
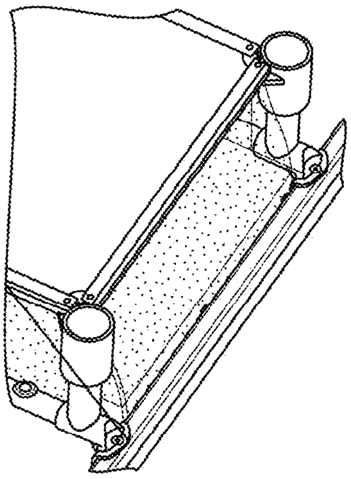
Figure 17:
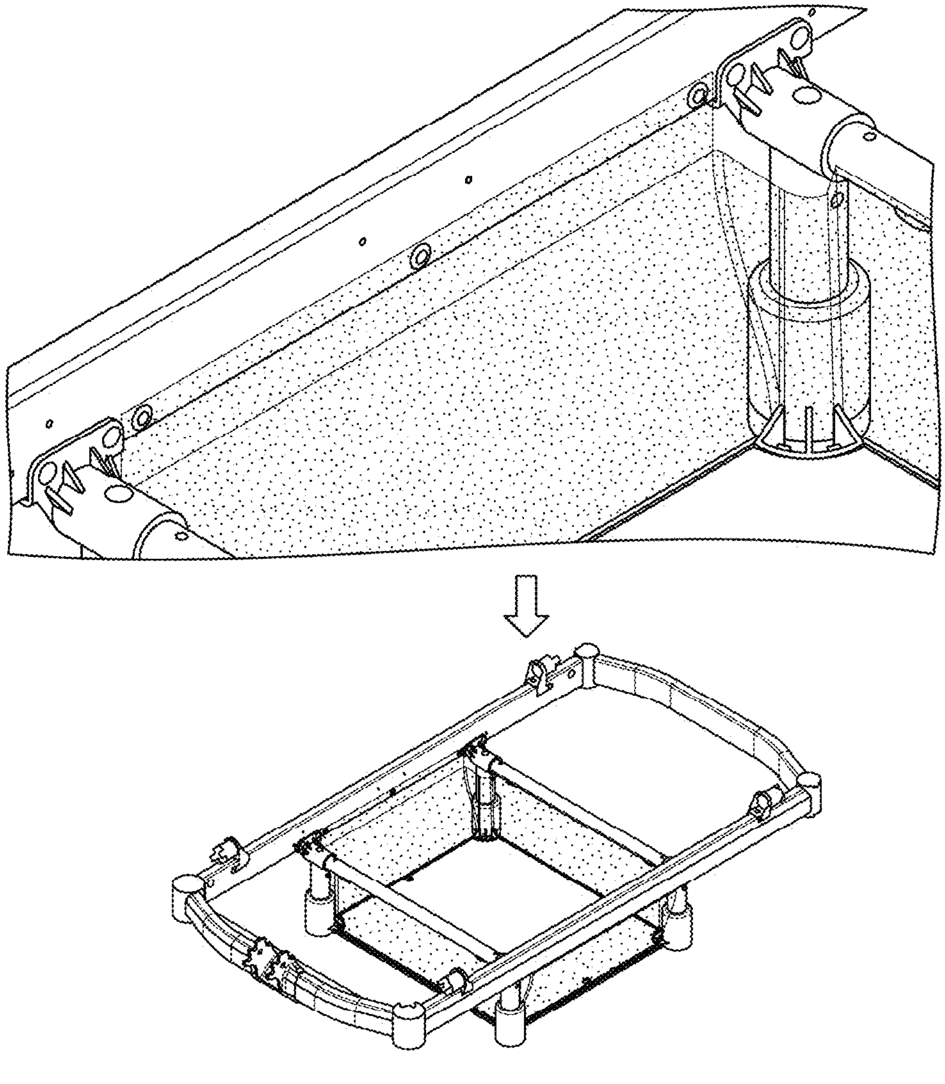

FIGS. 1-17 show a wagon 10 with a collapsible footwell feature 40 according to a first example embodiment of the invention. The wagon 10 includes a base 12, peripheral walls 14 extending upright from the base, wheels 16 supporting and pivotally mounted (directly or indirectly) to the base, and a handle 18 pivotally mounted to the base. For example, the base 12 can include a peripheral frame, and the upright walls 14 can include two opposing sidewalls and two opposing endwalls, with the sidewalls and the endwalls all pivotally mounted at lower portions thereof to the base frame for pivoting from their upright/use position (FIG. 1) to their collapsed/stored position (not shown) folded down adjacent (i.e., against or closer to) the wagon base. The wagon 10 may include a bottom surface 20. In some aspects, the bottom surface 20 may include at least one seating surface, for example a first seating surface 22 (see FIG. 27), an additional seating surface. for example a second sealing surface 24 (see FIG. 27), and a footrest 42. In some aspects, the base 12 may include the bottom surface 20. In addition, the upright walls 14 can each include a structural frame (e.g., two outer uprights and an upper connecting member extending therebetween) and soft goods (e.g., fabric sheets) attached to the structural frame to form a contained space within the wagon. The wheels 16 can be displaceable from their use position, for example by being removable from the base, foldable flat to adjacent the base, etc. All of these features of the wagon can be of a conventional type and as such are not described in great detail herein. As an example, these features of the wagon can be of the same type as those described in U.S. Pat. No. 9,108,656, which is hereby incorporated herein by reference.

The collapsible footwell feature 40 includes the footrest 42 and upright elements 44 extending between the wagon base 12 (e.g., base frame) and the footrest. The footwell 40 also includes an opening in the wagon base 12 (e.g., where there is no bottom wall mounted to the base frame), which can have the same shape (e.g., rectangular) and size as the footrest 42 and be aligned directly above the footrest (e.g., generally centrally positioned in the wagon). In this embodiment, the upright elements 44 are provided by telescoping assemblies, for example four telescoping assemblies, with one in each of the four corners of the footrest 42. Each of the telescoping assemblies includes an upper telescoping segment extending downward from the base 12 and a lower telescoping segment extending upward from the footrest 42, aligned with the upper telescoping segment, and telescopingly engaging (e.g., concentrically sliding relative to) the upper telescoping segment. In other embodiments, each telescoping assembly includes more than two concentric telescoping segments, which embodiments can provide an even lower profile/height in the collapsed/stored position. And in other embodiments, each telescoping assembly includes an opening in the base through which extends an upright element with a top that is enlarged (e.g., flanged) so that it cannot fit down through the respective base opening, which embodiments may not provide as low a profile/height in the collapsed/stored position.

The footrest 42 can be provided by a link of a 4-bar linkage, or by a plate, panel, grate, or other rigid member that can support the weight of a child in the wagon 10. A footwell peripheral sidewall 46 (e.g., FIG. 5) of a flexible sheet material (e.g. soft goods such as fabric) can be provided surrounding the footrest 42 (e.g., on all four sides and ends), extending generally vertically between the footrest and the wagon base 12, and defining the footwell interior.

In the depicted embodiment, the footrest 42 drops freely under the force of gravity to the extended/use position, and elevates freely with minimal force into the collapsed/storage position, with no mechanical component(s) to restrict such movement. In other embodiments, lock or retainer mechanisms, which can be of a conventional type known in the art such as spring-biased pushpins, are provided to releasably secure the footrest in either position.

Because of this innovative design, the footwell 40 can be easily repositioned between the extended/use position (FIGS. 1-3) and the collapsed/storage position (FIG. 4) as may be desired for use or for storage/transport as may be desired at the time. In a commercial version of the depicted embodiment, with the wheels 16 (including the vertical supports that removably mount to the base frame) removed and the upright walls 14 folded down (not shown), the overall height of the collapsed wagon 10 is reduced from about 10.25 inches (with the footwell in the extended/use position) to about 8.375 inches (with the footwell in the collapsed/storage position), for a package volume reduction of about 17 percent.

FIGS. 9-17 show an example assembly method of the collapsible footwell 40 of the wagon 10 of the first example embodiment. In addition to showing an example method of assembling this particular footwell embodiment 40, these figures depict additional structural details of the design and construction of this particular footwell embodiment.

Figure 18:
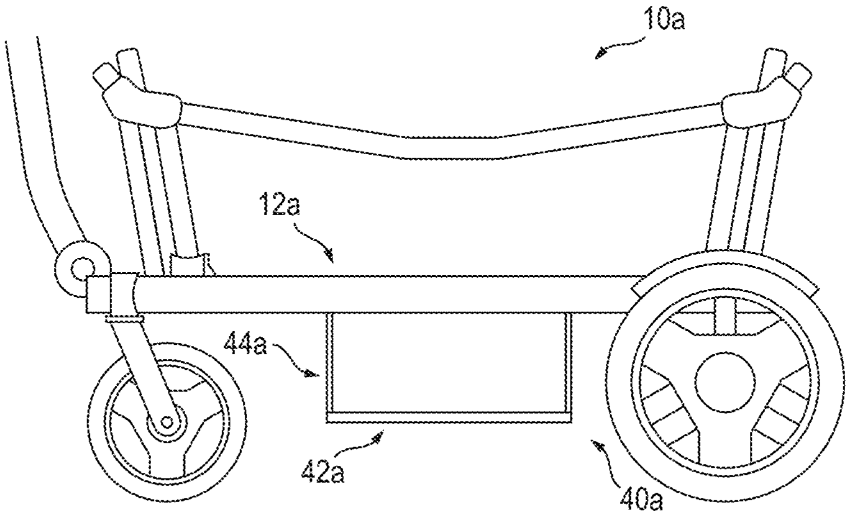
FIGS. 18-20 show a wagon with a collapsible footwell feature according to a second example embodiment of the invention.
Figure 19:
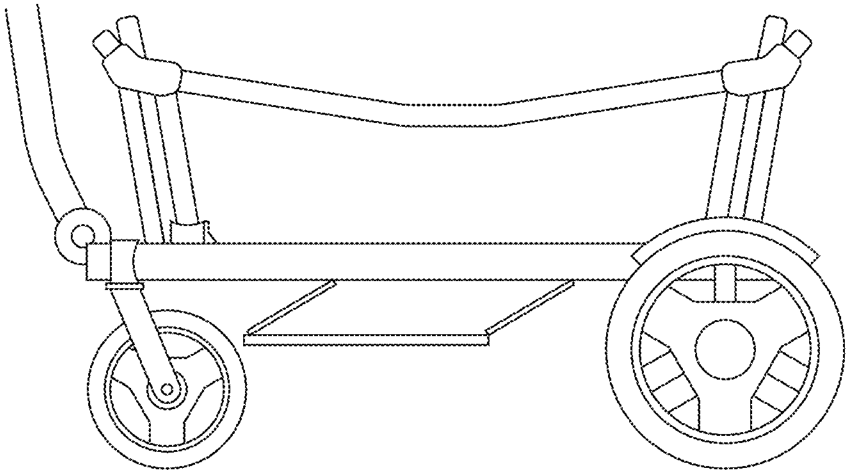
Figure 20:
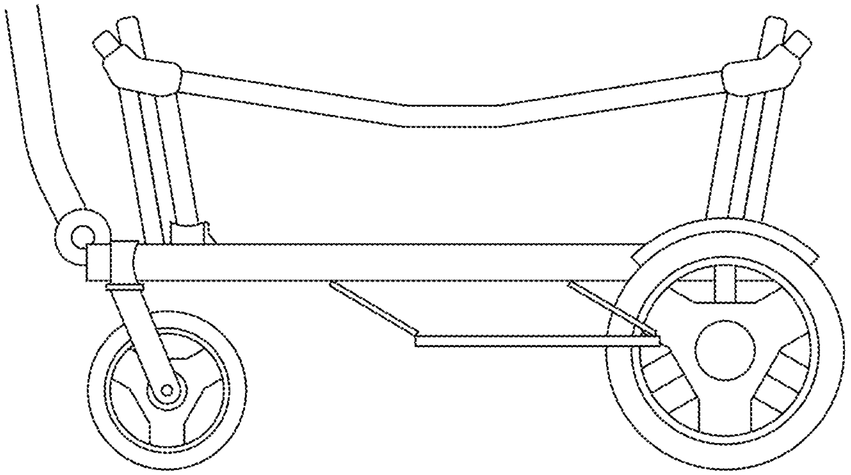

FIGS. 18-20 show a wagon 10*a* with a collapsible footwell feature 40*a* according to a second example embodiment of the invention. The collapsible footwell feature 40*a* of this embodiment is similar to that of the first embodiment in that it includes a footrest 42*a* and upright elements 44*a* extending between the wagon base 12*a* and the footrest. In this embodiment however, the upright elements are provided by at least two upright structural members, one forward and one rearward, that are each pivotally coupled at upper portions to the base and pivotally coupled at lower portions to the footrest. The pivotal couplings can be of a conventional design and assembly. The at least one forward upright structural member can be provided by two tubes, wires, rods, etc. at the two respective forward corners of the footrest, by a plate, panel, lattice, etc. extending laterally across the footrest, or by other conventional structural members, and the same applies to the at least one rearward upright structural member. In this way, the footwell can be collapsed from the extended/use position (FIG. 18) to the collapsed/storage position (FIGS. 19-20) by swinging/pivoting the footrest forward or rearward respectively. Also, a footwell peripheral sidewall (not shown) of soft goods (e.g., fabric) can be provided surrounding the footrest and defining the footwell interior.

Figure 21:
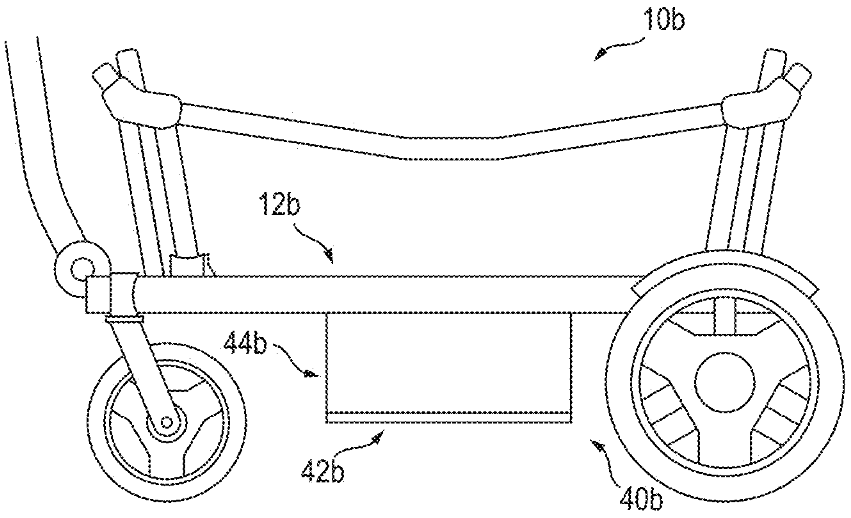
FIGS. 21-22 show a wagon with a collapsible footwell feature according to a third example embodiment of the invention.
Figure 22:
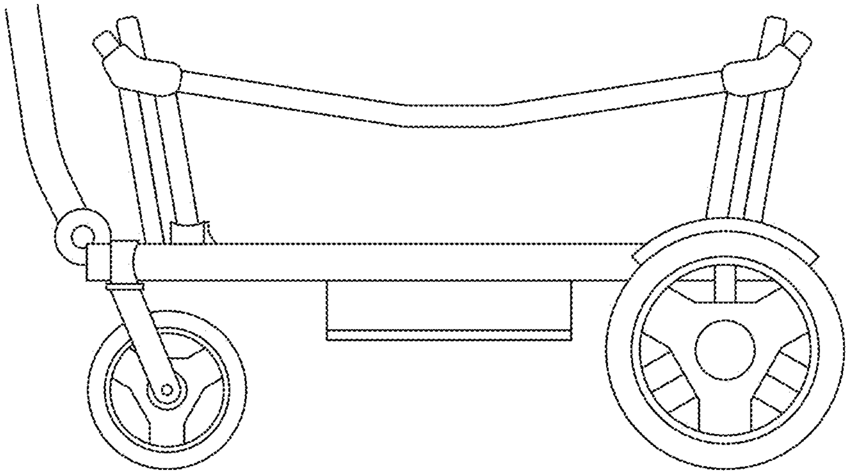

FIGS. 21-22 show a wagon 10*b* with a collapsible footwell feature 40*b* according to a third example embodiment of the invention. The collapsible footwell feature 40*b* of this embodiment is similar to that of the first embodiment in that it includes a footrest 42*b* and upright elements 44*b* extending between the wagon base 12*b* (e.g., a base frame) and the footrest. In this embodiment, however, the upright elements are provided by a sheet of flexible material (e.g., soft goods such as fabric), for example forming a peripheral wall surrounding the footrest and defining the footwell. The fabric peripheral wall is not rigid or structural in the vertical dimension, though it can have peripheral reinforcing elements (e.g., ala an accordion) for holding it shape. The maximum depth of the footwell is thus limited by the installed height of the fabric, so that the fabric limits the maximum depth of the footwell in the extended/use position (FIG. 21) and permits compression of the footwell to the collapsed/storage position (FIG. 22). Depending on the flexible sheet material selected, the footrest in the collapsed/storage position can be elevated/compressed closer to the wagon base frame than is shown in FIG. 22, or even received within and flush with the wagon base.

Figure 23:
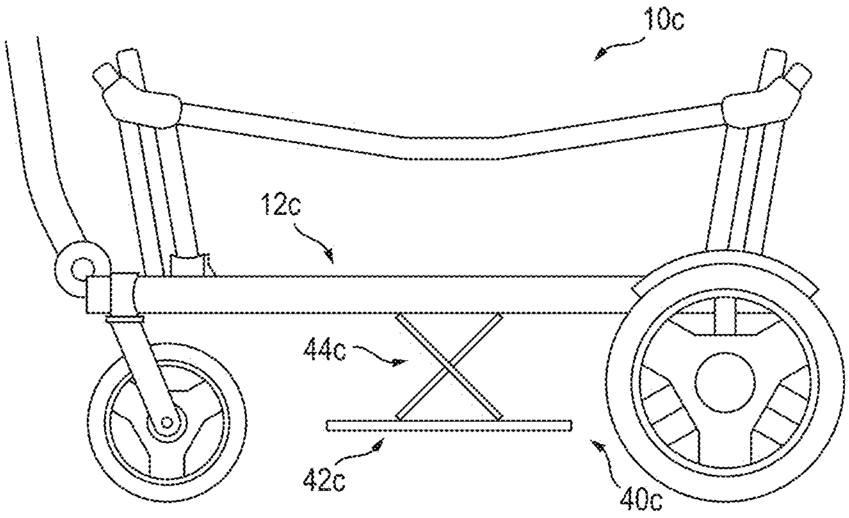
FIGS. 23-24 show a wagon with a collapsible footwell feature according to a fourth example embodiment of the invention.
Figure 24:
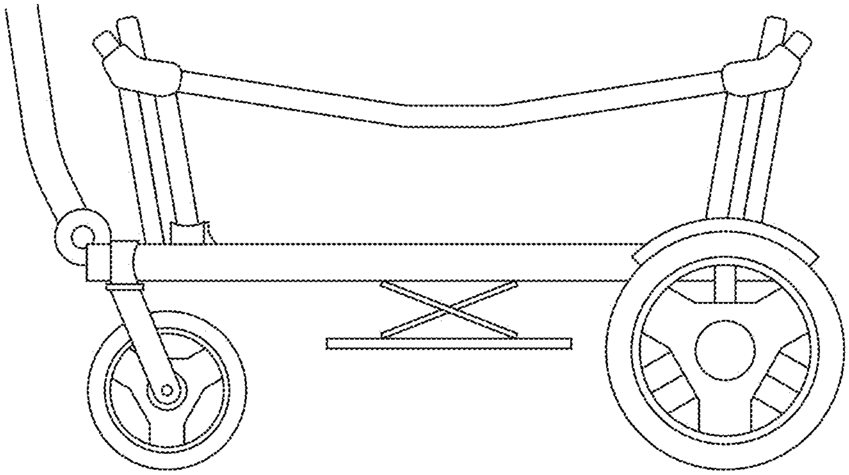

FIGS. 23-24 show a wagon 10*c* with a collapsible footwell feature 40*c* according to a fourth example embodiment of the invention. The collapsible footwell feature 40*c* of this embodiment is similar to that of the first embodiment in that it includes a footrest 42*c* and upright elements 44*c* extending between the wagon base 12*c* (e.g., a base frame) and the footrest. In this embodiment, however, the upright elements are provided by side linkages, for example the depicted X-braces that are each pivotally mounted at upper portions thereof to the wagon base, pivotally mounted at lower portions thereof to the footrest, and pivotally mounted at intermediate portions thereof to each other. The X-braces can be provided by tubes, rods, etc., and the pivotal couplings can be of a conventional design and assembly. In this way, the footwell can be collapsed from the extended/use position (FIG. 23) to the collapsed/storage position (FIG. 24). Also, a footwell peripheral sidewall (not shown) of soft goods (e.g., fabric) can be provided surrounding the footrest and defining the footwell interior.

Figure 25:
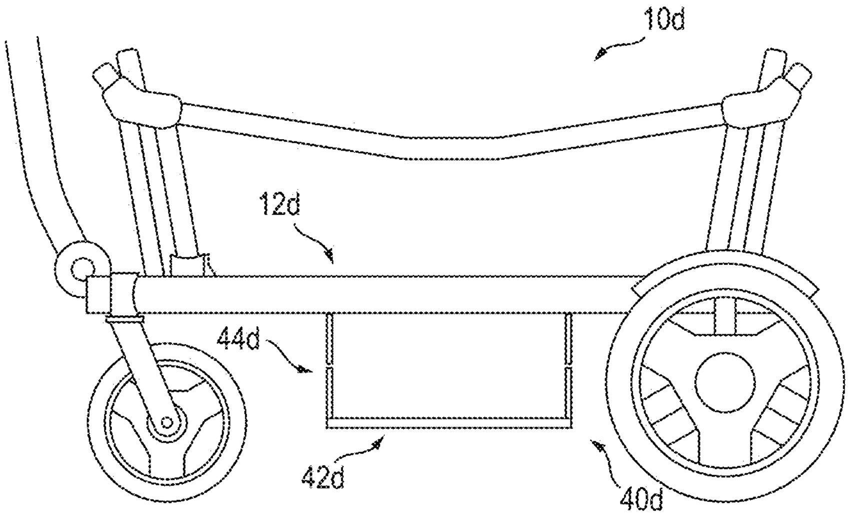
FIGS. 25-26 show a wagon with a collapsible footwell feature according to a fifth example embodiment of the invention.
Figure 26:
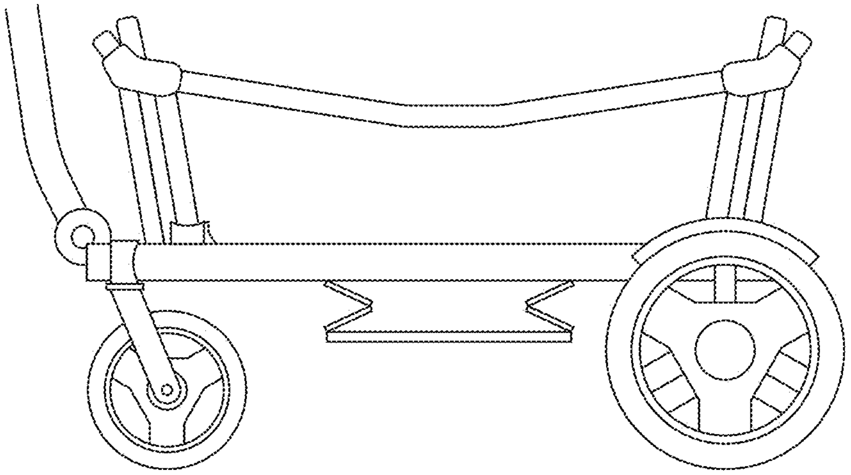

FIGS. 25-26 show a wagon 10*d* with a collapsible footwell feature 40*d* according to a fifth example embodiment of the invention. The collapsible footwell feature 40*d* of this embodiment is similar to that of the first embodiment in that it includes a footrest 42*d* and upright elements 44*d* extending between the wagon base 12*d* (e.g., a base frame) and the footrest. In this embodiment, however, the upright elements are provided by end linkages, for example the depicted forward and rearward end linkages. Each of the linkages includes at least two link segments pivotally coupled together. In the depicted embodiment, each end linkage includes two link segments pivotally coupled together with the upper link segment pivotally coupled at its top to the wagon base and with the lower link segment pivotally coupled at its bottom to the footrest, though in other embodiments more than two link segments can be provided in each in the linkage. The link segments can be provided by tubes, bars, rods, panels, etc., and the pivotal couplings can be of a conventional type. The at least one forward linkage can be provided by two forward linkages at the respective two forward corners of the footrest, by a plate, panel, lattice, etc. extending laterally across the footrest, or by other conventional structural linkages, and the same applies to the at least one rearward linkage. In this way, the footwell can be collapsed from the extended/use position (FIG. 25) to the collapsed/storage position (FIG. 26). Also, a footwell peripheral sidewall (not shown) of soft goods (e.g., fabric) can be provided surrounding the footrest and defining the footwell interior.

In other embodiments not depicted herein but contemplated by the invention, other conventional linkage systems can be implemented extending between and interconnecting the wagon base and the footrest to permit the footrest to compress, fold, slide, screw, or otherwise collapse from its extended/use position to its/storage position closer to the wagon base.

Turning now to the position-locking handle feature, on a typical wagon the handle is free to rotate about its axis until its movement is limited by the wagon geometry or the ground. But on the wagon of the present invention, the handle locks in one or more positions. Locking handle design options include automatic lock or only when intentioned by the user.

FIGS. 27-42 show the wagon 10 with a position-locking handle feature 70 according to a sixth example embodiment of the invention. The wagon 10 can be of the same type as that described above or it can be a different style of wagon. As such, the wagon 10 includes a base 12, peripheral walls 14, wheels 16, a handle 18, and a bottom surface 20. The bottom surface 20 may include a first seating surface 22, a second sealing surface 24. and a footrest. In some aspects, the base 12 may include the bottom surface 20. Further details of the design and construction are not described herein for brevity.

The position-lockable handle 70 includes a handle 18, a pivot-lock mechanism 72, and a lock-release mechanism 74. The pivot-lock mechanism 72 pivotally attaches the handle 18 at a lower portion thereof to the wagon (e.g., at the front of the base) 12 to permit the handle to travel through a pivotal path in a vertical plane, and releasably locks the handle in multiple discrete predefined positions of its pivotal path. The lock-release mechanism 74 can be manually actuated to engage and reposition the pivot-lock mechanism 72 from its locked position to its released position to release the handle to travel through its pivotal path.

Figure 27:
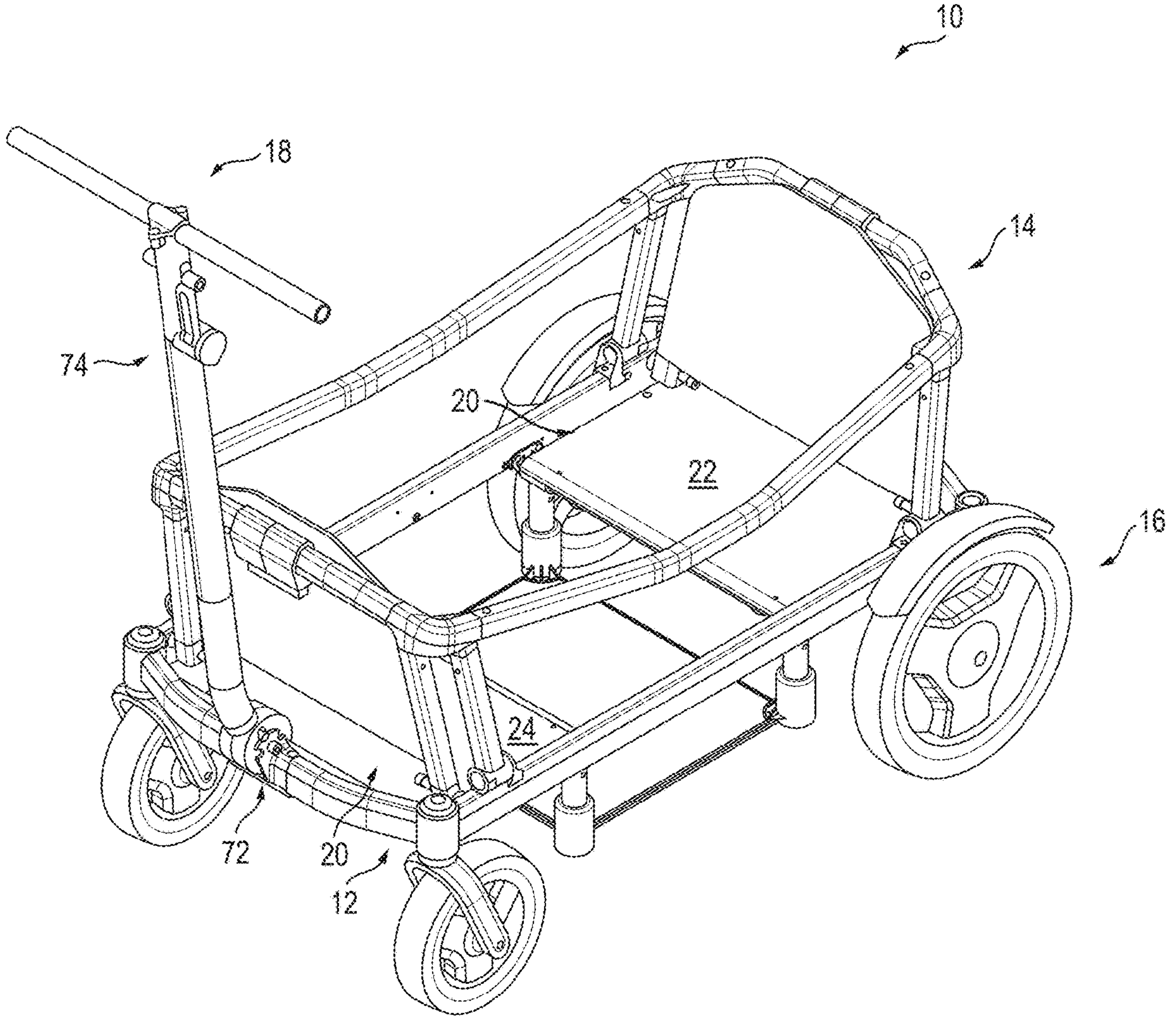
FIGS. 27-42 show a wagon with a position-locking handle feature according to a sixth example embodiment of the invention.
Figure 28:
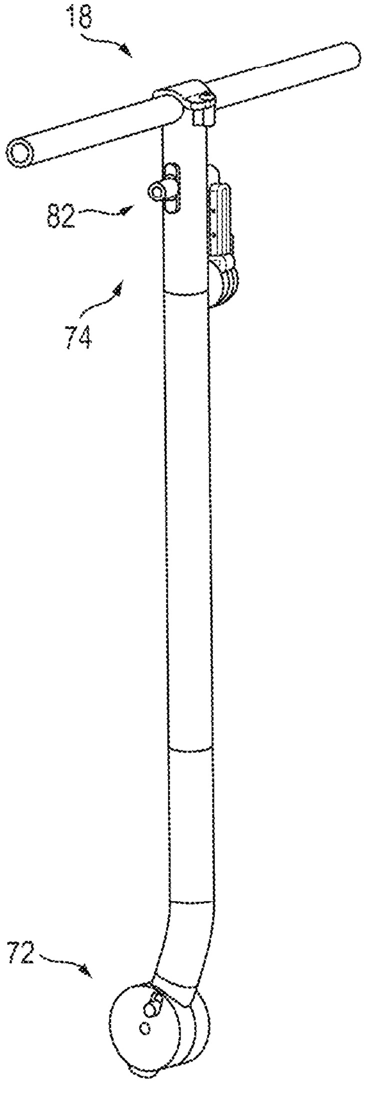
Figure 29:
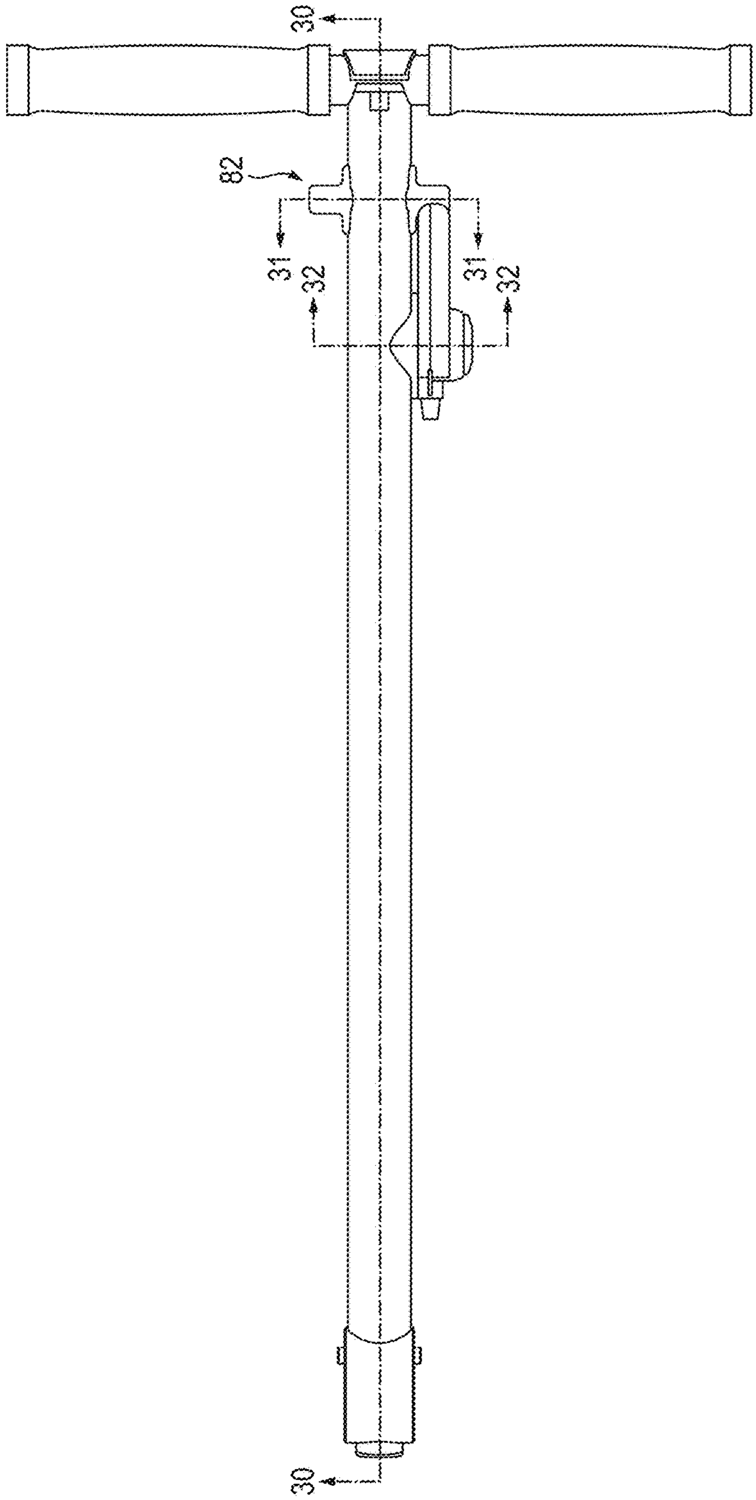
Figure 30:
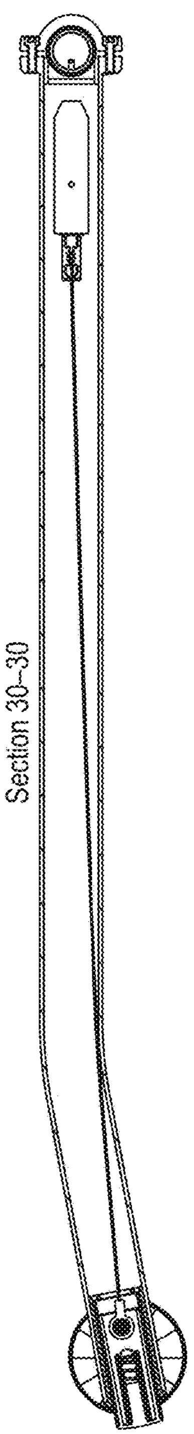
Figure 31:
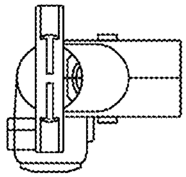
Figure 32:
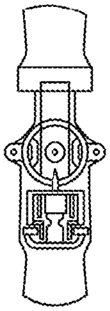
Figure 33:
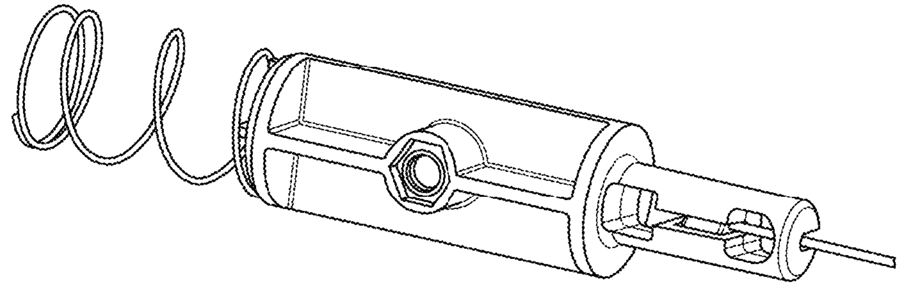
Figure 34A:
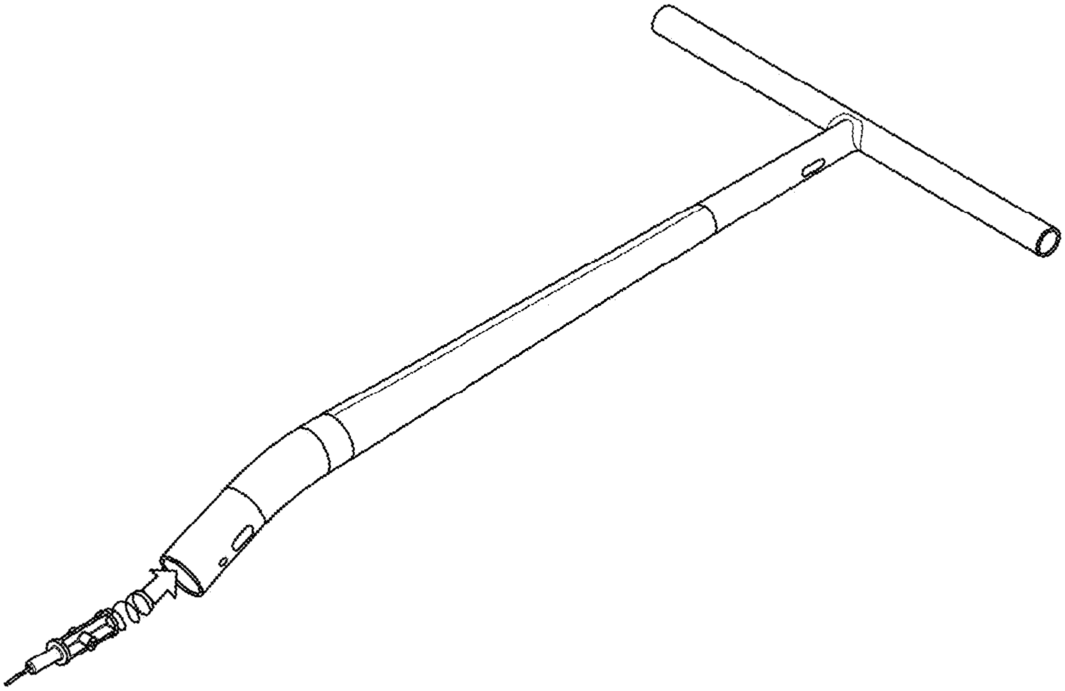
Figure 34B:
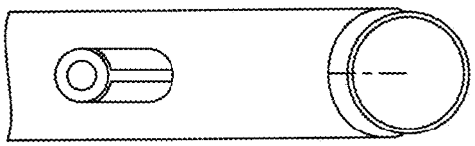
Figure 35:
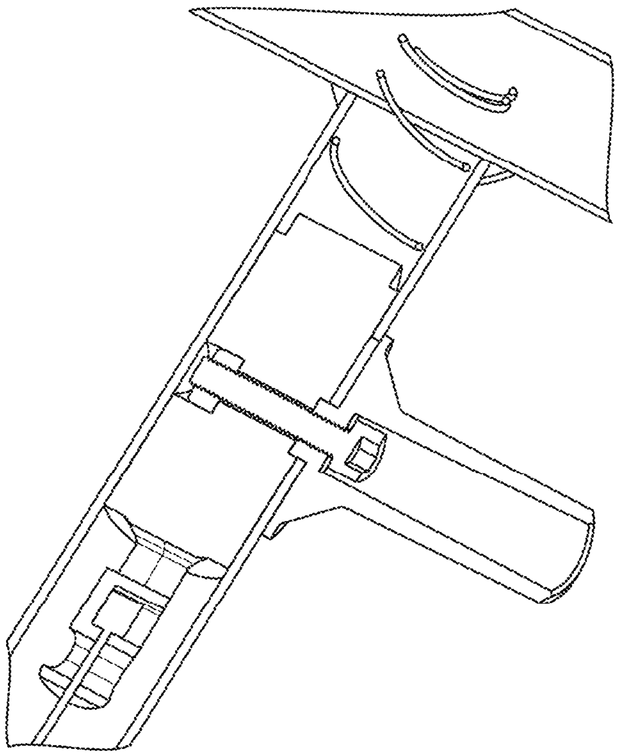
Figure 36:
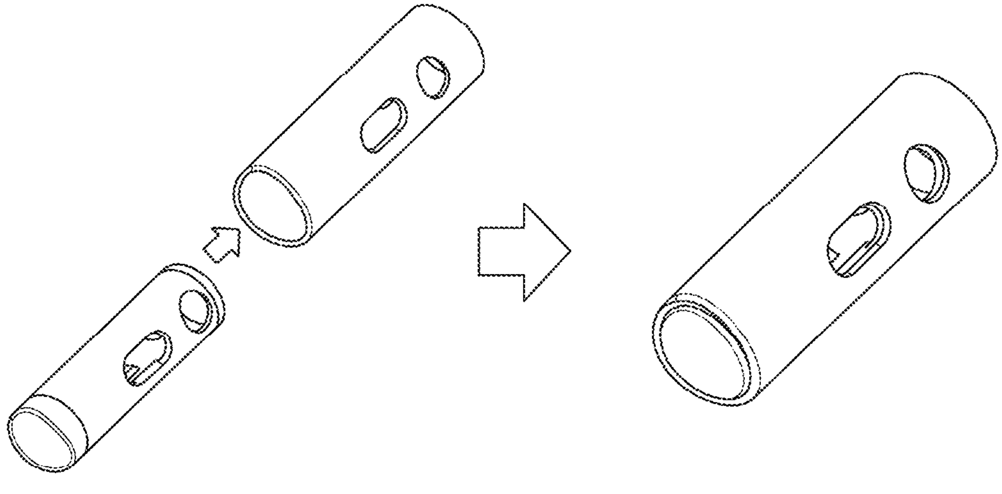
Figure 37:
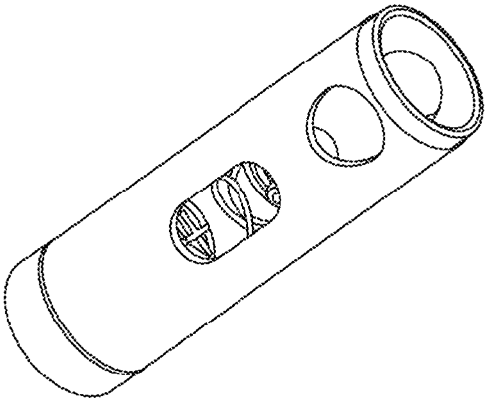
Figure 38:
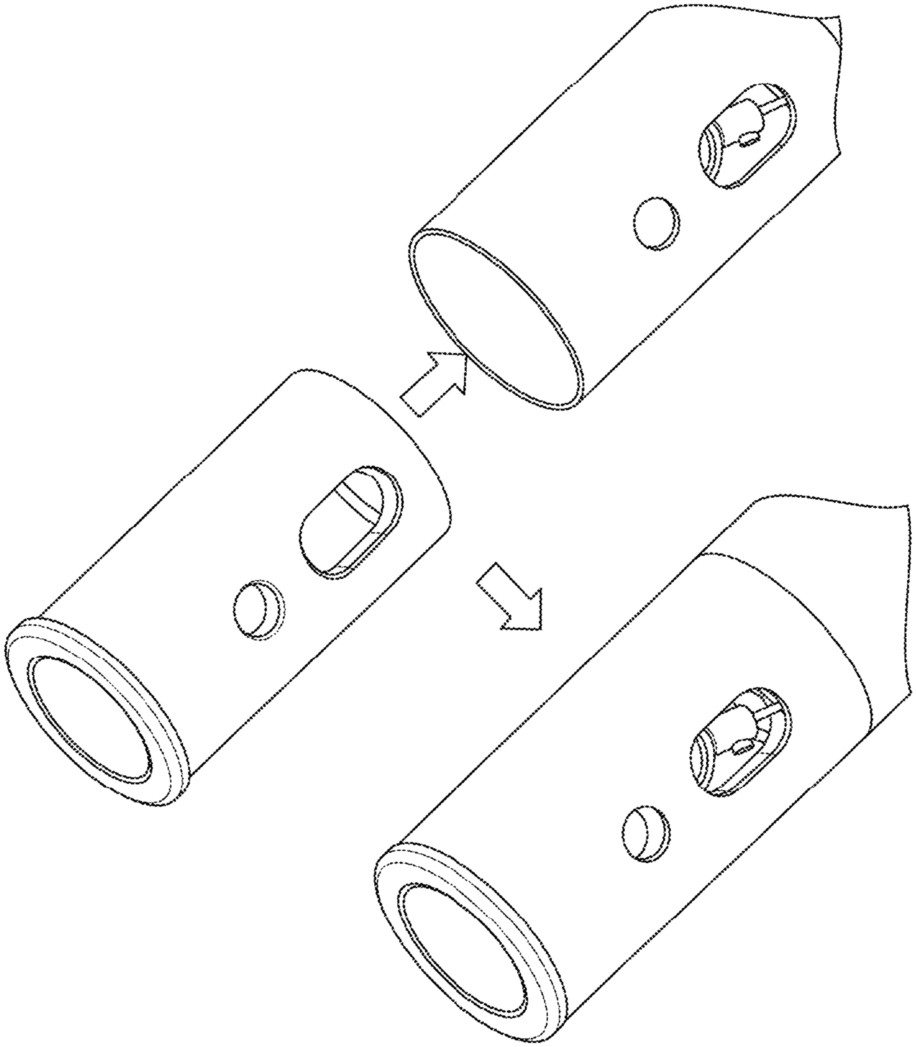
Figure 39:
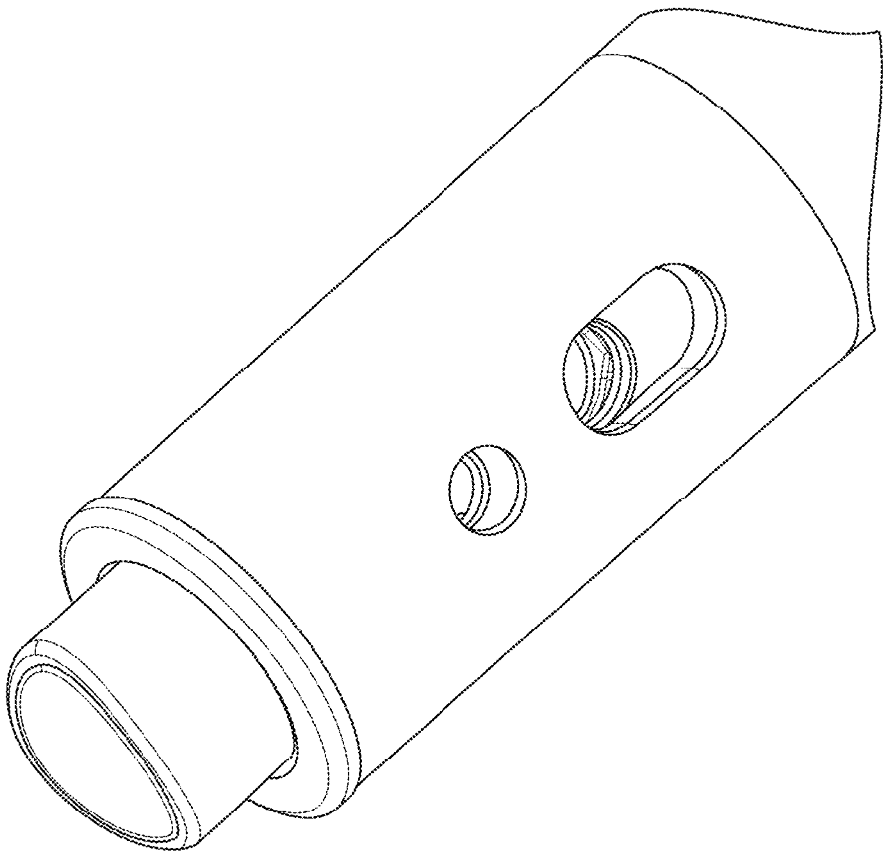
Figure 40A:
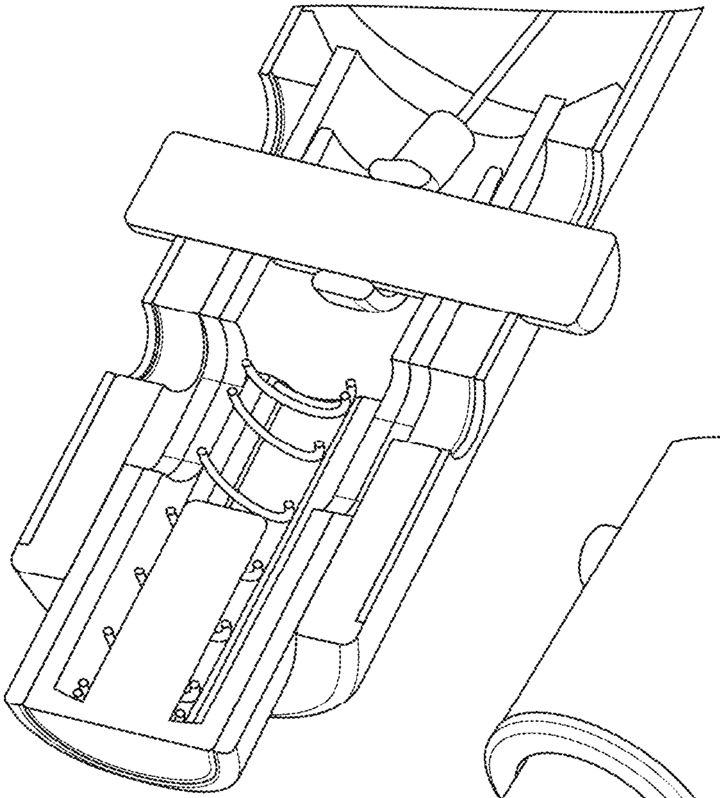
Figure 40B:
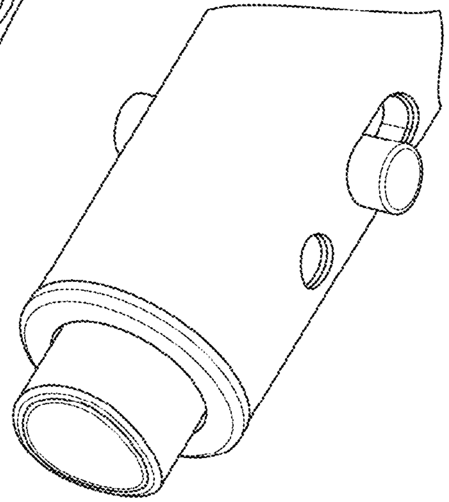
Figure 41A:
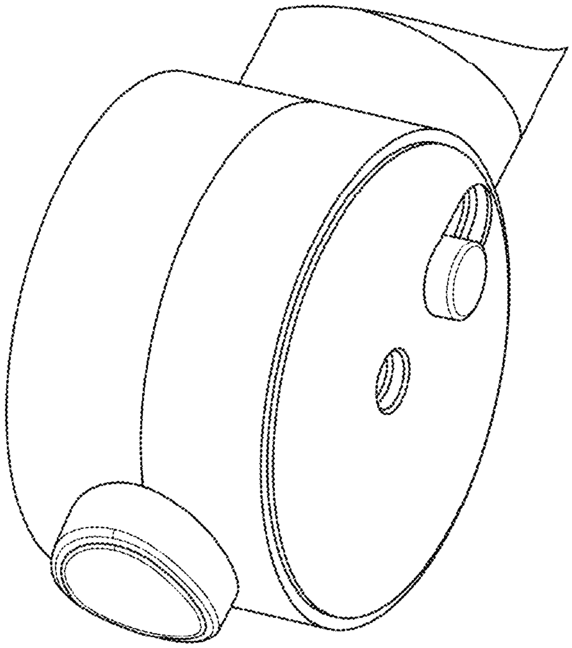
Figure 41B:
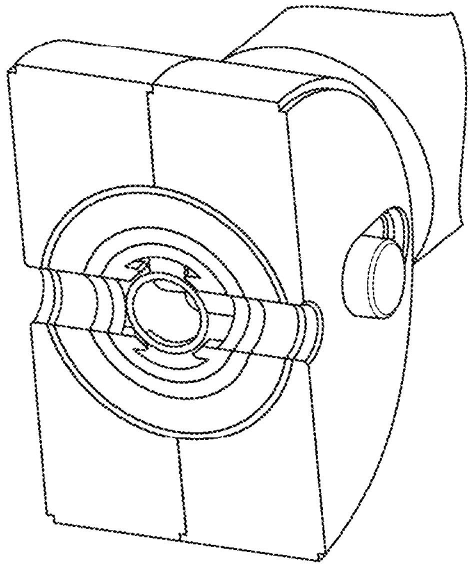
Figure 42:
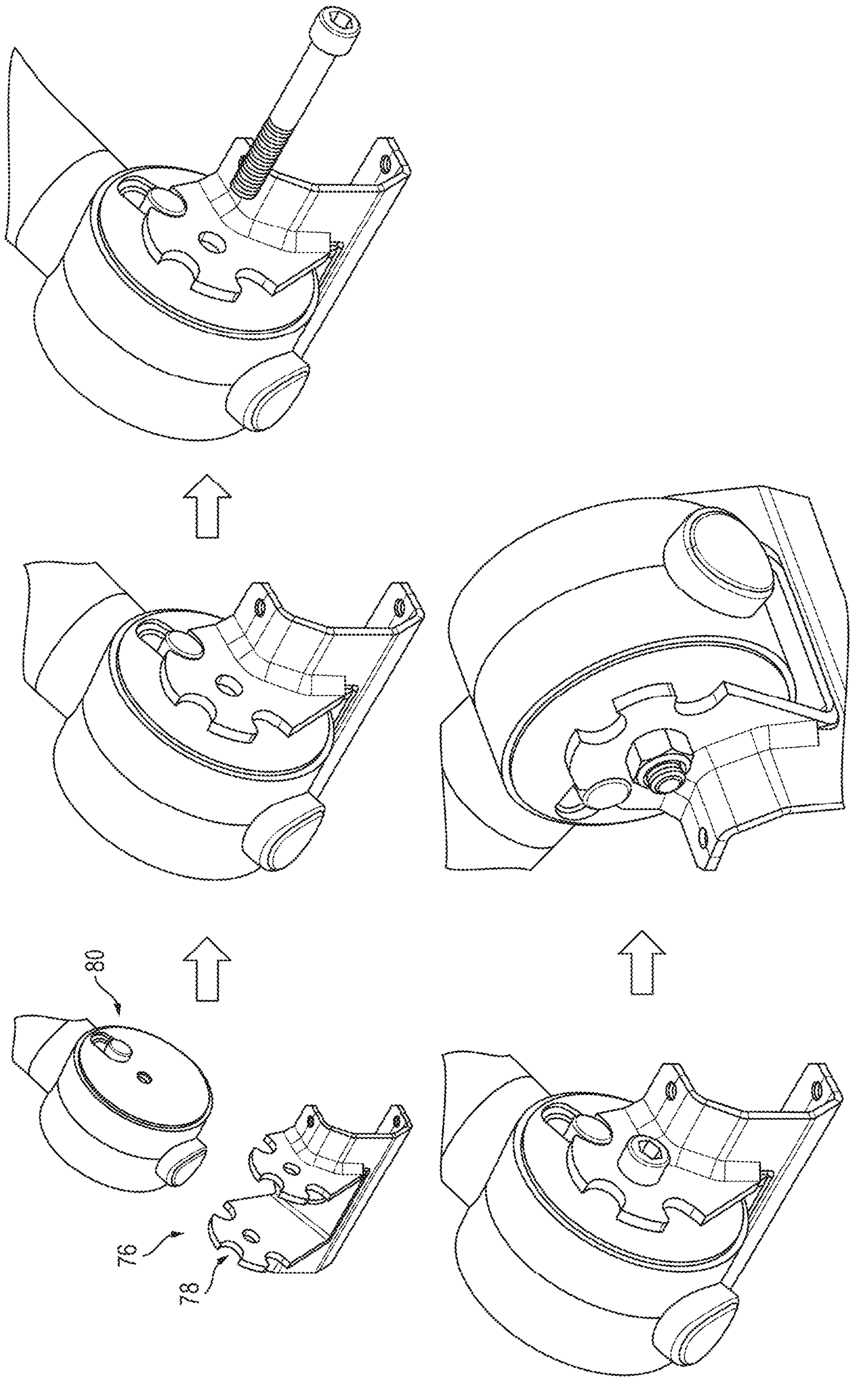

In the depicted embodiment, the pivot-lock mechanism 72 locks the handle in a "stowed" position folded backward/down onto the base in a compact arrangement for storage and/or transport (not shown), a "down" position folded forward/down but away from the base in an extended arrangement for pulling the wagon 10 (not shown), and an "upright" position between the stowed and down positions (FIG. 27). In other embodiments, the pivot-lock mechanism locks the handle in more, fewer, and or other positions. In some embodiments, the pivot-lock mechanism includes a manual lock that is operable to manually engage interlocking parts of the pivot-lock mechanism to permit the handle to be selectively locked the multiple positions only when manually actuated, and in some embodiments the lock-release mechanism includes an automatic release that is operable to automatically disengage the pivot-lock mechanism.

In typical embodiments of the pivot-lock mechanism 72 (see FIGS. 27 and 42), it includes a position-defining member 76 mounted to the wagon, for example the depicted two semicircular mounting brackets 76 that are mounted to the wagon base front in a spaced apart relationship, that have the handle 18 pivotally mounted to and between them, that each define multiple serial lock notches 78, and that are arranged so that corresponding lock notches on each bracket are in lateral alignment. In addition, the pivot-lock mechanism 72 includes at least one lock protrusion 80 that is movably mounted to the handle 18 and that releasably engages the position-defining member 76, for example the depicted two pins extending outwardly from opposite sides of the handle and receivable in sequential pairs of the lock notches 78. The rearmost notches 78 define the stowed position, the forward most notches define the down position, and the intermediate notches define the upright position. The lock protrusions 80 are spring-biased into their locking position in which they can engage one set of the aligned notches 78, and can be withdrawn from notch engagement against the spring force into their release position. In the depicted embodiment, the lock protrusions 80 move generally radially relative to the positioning bracket 76 between the locking and release positions, though in other embodiments they can move axially into and out of the notches.

And the lock-release mechanism 74 of the depicted embodiment (see FIGS. 27-31) includes a release actuator 82 that is operably coupled (e.g., by a cable) to the locking protrusion 80 (e.g., to an internal body from which the actual protrusion extends outwardly from). The release actuator 82 moves between a locked position and a release position, and is biased toward the locked position by its connection to the spring-biased locking protrusion 80. In this way, moving the release actuator 82 from its locked position to its released position causes the lock protrusion 82 correspondingly move from its locked position to its released position so that it is disengaged from the notches 78 and thus the handle 18 is free to pivot through its travel path. In other embodiments, the release actuator moves axially, rotationally, helically, or in another manner to disengage the locking protrusion. And in other embodiments, the lock-release mechanism disengages the pivot-lock mechanism by another type of actuator (e.g., a foot pedal), by a certain movement of the handle (e.g., lateral), or by another structure.

In this way, the handle 18 locks into a position automatically (under the spring influence) when the handle is placed into one of the preset locking positions. The upright position places the handle in an easily accessible position, the stowed position locks the handle in a folded position (folded over the wagon side walls) locking the wagon side walls in a folded condition, and in the down position the handle range of motion is limited to prevent the handle from contacting the ground.

Advantages of this innovation include that locking the handle 18 in the upright position eliminates the possibility of the handle resting against a seat back of the wagon 10. Thus, if the user pushes against the handle 18 (towards the body of the wagon 10) when the handle is in the upright position, the load will not be transferred into the seat back. This is particularly important if the seat back folds. Also, locking the handle 18 in the upright position places the handle in an ideal position for pushing the wagon 10.

In addition, locking the handle 18 in the down position prevents it from contacting the ground, places the handle in a more easily accessible location (reduces and/or eliminates the need to bend over to grab the handle), and prevents the handle from being damaged from rubbing rough surfaces (e.g. the ground).

Furthermore, in the stowed position the handle 18 is folded down over the folded wagon peripheral walls and can be locked in place thereby acting as a storage latch to prevent unintentional unfolding of the wagon peripheral walls.

In other embodiments, the handle does not lock automatically. Instead, the user must manually lock the handle into a fixed position. And in other embodiments, the pivot lock mechanism provides no discrete lock positions (e.g. no lock notches), so the user can manually position and secure the handle and any desired position in the pivotal travel path of the handle.

FIGS. 33-42 show an example assembly method of the position-lockable handle 70 of the wagon 10 of the sixth example embodiment. In addition to showing an example method of assembling this particular handle embodiment 70, these figures depict additional structural details of the design and construction of this particular handle embodiment.

Figure 43:
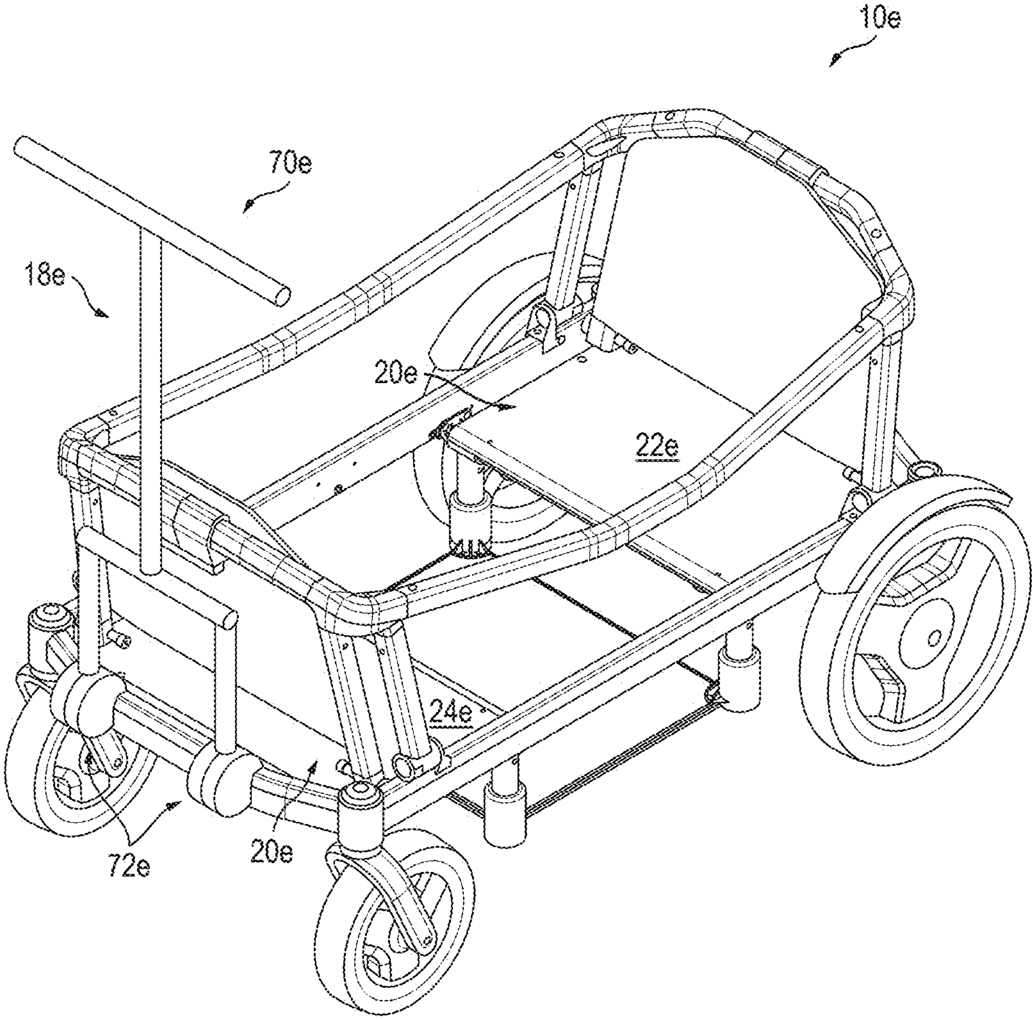
FIG. 43 shows a wagon with a position-lockable handle according to a seventh example embodiment of the invention.

FIG. 43 shows a wagon 10*e* with a position-lockable handle 70*e* according to a seventh example embodiment of the invention. In some aspects, for example as shown in FIG. 43, the wagon 10*e* may include a bottom surface 20*e*. The bottom surface 20*e* may include a first seating surface 22*e*, a second seating surface 24*e*, and a footrest. The position-lockable handle 70*e* of this embodiment is similar to that of the sixth embodiment in that it includes a handle 18*e*, a pivot-lock mechanism 72*e*, and a lock-release mechanism (not shown). In this embodiment, however, the handle 18*e* is forked at its bottom and includes two of the pivot-lock mechanisms 72*e* to spread the load and facilitate a smooth pivoting motion. The lock-release mechanism can be of the same type is that described above.

Figure 44:
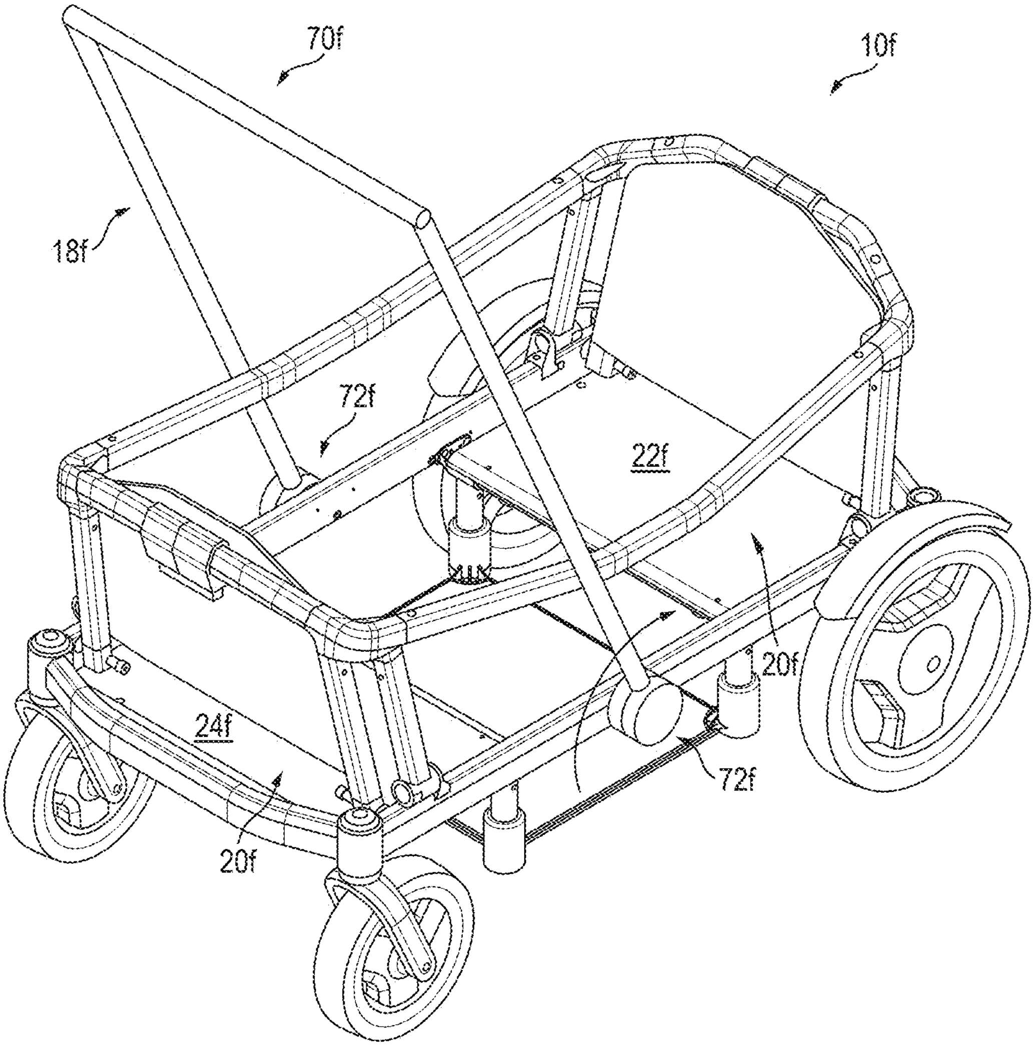
FIG. 44 shows a wagon with a position-lockable handle according to an eighth example embodiment of the invention.

FIG. 44 shows a wagon 10*f* with a position-lockable handle 70*f* according to an eighth example embodiment of the invention. In some aspects, for example as shown in FIG. 44, the wagon 10*f* may include a bottom surface 20*f*. The bottom surface 20*f* may include a first seating surface 22*f*, a second seating surface 24*f*, and a footrest. The position-lockable handle 70*f* of this embodiment is similar to that of the seventh embodiment in that it includes a handle 18*e* with two ends and with two pivot-lock mechanisms 72*e* mounting the handle ends to the base, and a lock-release mechanism (not shown). In this embodiment, however, the handle 18*e* is U-shaped, pivotally mounts to the wagon base at the middle of its sides, and has a length that is greater than one half of the base length, so that the pivotal travel of the handle is not limited by the front end wall of the wagon in its upright use position, and instead the handle can be swung over/around the upright walls through at least a 180° pivotal path for positioning at either end of the wagon and pulling the wagon from either end. The lock-release mechanism can be of the same type as that described above.

Figure 45:
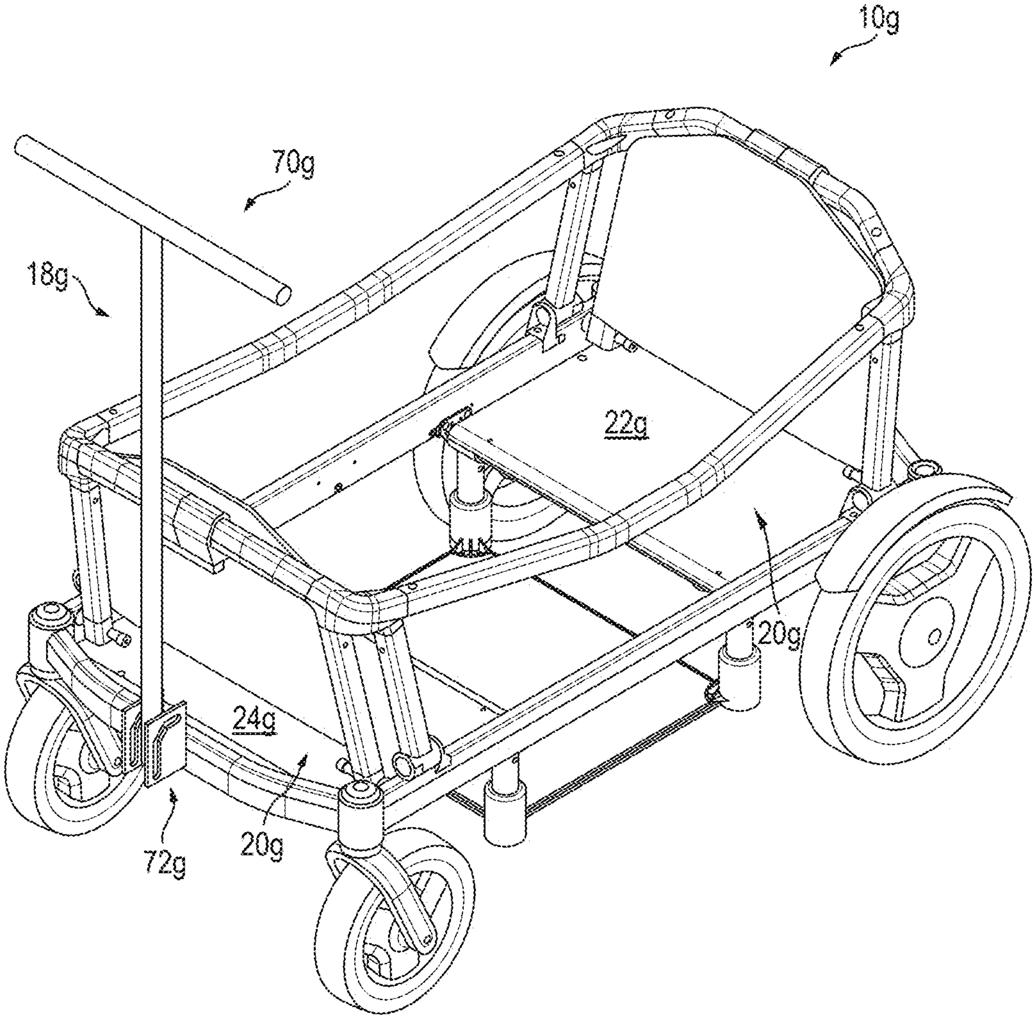
FIGS. 45-48 show a wagon with a position-lockable handle according to a ninth example embodiment of the invention.
Figure 46:
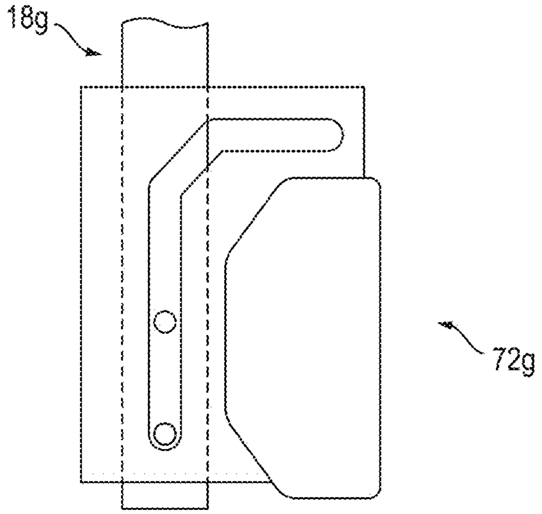
Figure 47:
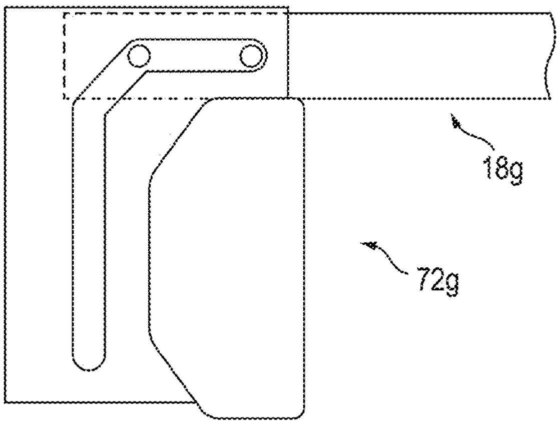
Figure 48:
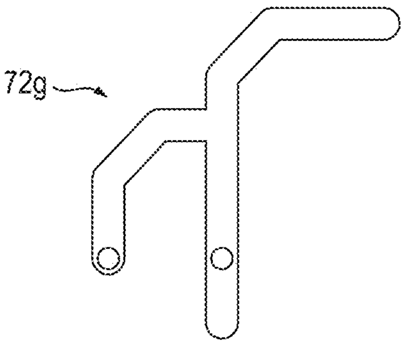

FIGS. 45-48 show a wagon 10*g* with a position-lockable handle 70*g* according to a ninth example embodiment of the invention. In some aspects, for example as shown in FIG. 45, the wagon 10*g* may include a bottom surface 20*g*. The bottom surface 20*g* may include a first seating surface 22*g*, a second seating surface 24*g*, and a footrest. The position-lockable handle 70*g* of this embodiment is similar to that of the sixth embodiment in that it includes a handle 18*g*, a pivot-lock mechanism 72*g*, and a lock-release mechanism (not shown). In this embodiment, however, the pivot-lock mechanism 72*g* includes at least one elongated guide track (e.g., a slot or channel formed in an inner wall of a plate or housing mounted to the wagon base) and at least one follower member (e.g., two spaced-apart pins extending outward from a bottom portion of the handle 18*g* and received and guided by the track). The handle 18*g* does not pivot about an axis, but instead the pin(s) slide within the slot(s) to permit folding and "locking" into one of multiple positions. The lock-release mechanism can be of the same type as that described above.

Figure 49:
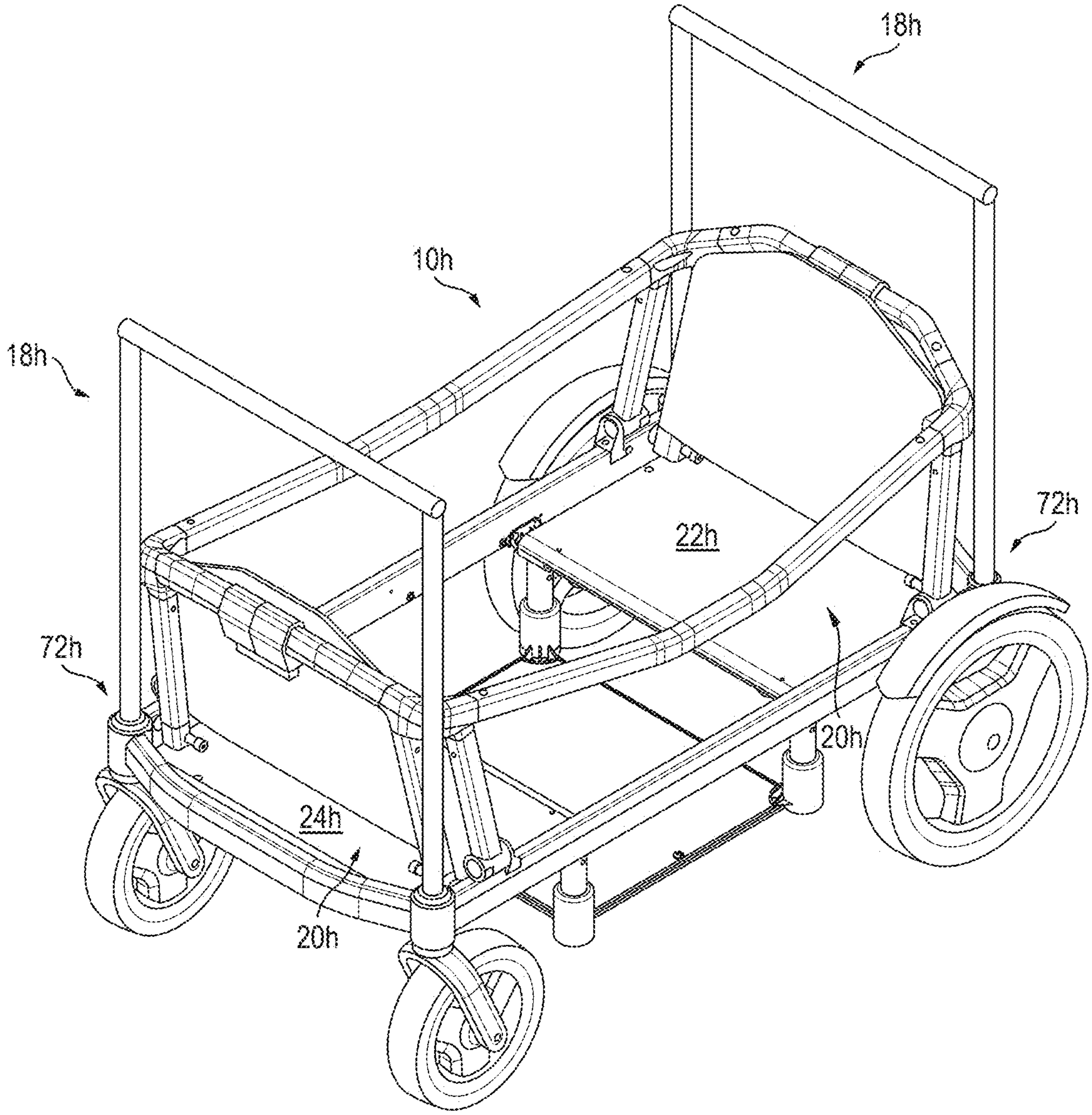
FIG. 49 shows a wagon with a position-lockable handle according to a tenth example embodiment of the invention.

FIG. 49 shows a wagon 10*h* with a position-lockable handle 70*h* according to a tenth example embodiment of the invention. In some aspects, for example as shown in FIG. 49, the wagon 10*h* may include a bottom surface 20*h*. The bottom surface 20*h* may include a first seating surface 22*h*. a second seating surface 24*h*, and a footrest. The position-lockable handle 70*h* of this embodiment is similar to that of the sixth embodiment in that it includes a handle 18*h*, a pivot-lock mechanism 72*h*, and a lock-release mechanism (not shown). In this embodiment, however, the pivot-lock mechanism 72*h* removably mounts onto the wagon base, for example the bottom end of the handle tube 18*h* can lock into a receiver on the wagon frame. Pivotal articulation of the handle 18*h* can be incorporated into the handle end or the base receiver. Removable mounts can be provided at each end of the wagon base and two of the handles 18*h* provided, with the handles interchangeably mountable in the removable mount(s) at each end of the wagon base. The handles 18*h* can be generally U-shaped each with two mounting ends, and the removable mounts can be provided at the corners of the wagon, as depicted. The lock-release mechanism can be of the same type as that described above, or it can be provided by a detent connection between the handle and the wagon base that assists gravity in retaining the handle connection to the wagon during use but can be overcome by applying an upward force.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A wagon, comprising:
a wall that is positionable in a use position and in a second position different from the use position, the wall at least partially defining a container;
a footwell extending below a bottom surface of the container;
a plurality of wheels; and
a handle positionable in a first position in which a handle lock mechanism locks the handle in the first position for propulsion of the wagon,
wherein the handle is positionable in a second position in which the handle lock mechanism is disengaged to permit the handle to rotate about at least one pivot point during propulsion of the wagon, and
wherein the handle lock mechanism includes an actuator, a cable, and a locking protrusion, wherein the actuator is coupled to the cable for actuating the locking protrusion between a locked position corresponding to the handle in the first position and a released position corresponding to the handle in the second position.

2. The wagon of claim 1, wherein the footwell is positionable in an extended position and a storage position.

3. The wagon of claim 1, wherein the bottom surface further comprises at least one seating surface.

4. The wagon of claim 3, wherein the wall further defines a seat back which together with the at least one seating surface defines a seat for a child within the wagon.

5. The wagon of claim 4, wherein in the first position the handle is positioned such that it does not contact a surface of the wall defining the seat back.

6. The wagon of claim 1, wherein the actuator is positioned on the handle of the wagon.

7. The wagon of claim 1, wherein the handle is further positionable in a stowed position, that differs from each of the first and second positions, wherein in the stowed position the handle extends longitudinally along a length of the wagon and is positioned adjacent a surface of the wall for reducing a total height of the wagon.

8. The wagon of claim 7, wherein in the stowed position the handle is locked in place by the handle lock mechanism.

9. The wagon of claim 1, wherein the locking protrusion is spring-biased towards the locked position for automatically locking the handle in the first position.

10. The wagon of claim 1, wherein the at least one pivot point includes a pair of pivot points where a first lateral portion and a second lateral portion of the handle define a U-shaped handle and are pivotally mounted to opposite sides of the wagon.

11. A wagon, comprising:
at least one peripheral wall, the at least one peripheral wall defining a first end wall and a second end wall;
a bottom surface coupled to the at least one peripheral wall, together the bottom surface and the at least one peripheral wall form a container; and
a handle that is positionable in (a) a first position in which the handle is locked in the first position via a locking mechanism for facilitating propulsion of the wagon, and (b) a second position in which the handle is moveable about at least one pivot point for facilitating propulsion of the wagon, and (c) a storage position in which the handle is positioned longitudinally along a length of the wagon for reducing a total height of the wagon, wherein the locking mechanism comprises an actuator positioned on the handle and coupled to a cable extending along a length of the handle and coupled to a protrusion that is sized and shaped to engage with a plurality of notches for selectively positioning the handle in the first, second, or storage positions.

12. The wagon of claim 11, wherein the handle is U-shaped.

13. The wagon of claim 11, wherein the protrusion is spring-biased in a locked position in which the protrusion is engaged with one of the plurality of notches.

14. The wagon of claim 13, wherein the protrusion is engaged with one notch of the plurality of notches when the handle is in the first position.

15. The wagon of claim 11, wherein the protrusion is positioned at an opposite end of the handle as the actuator.

16. The wagon of claim 11, wherein the wall further defines an additional seat back and the bottom surface further defines an additional seating surface that together define a second seat for a child.

17. The wagon of claim 11, wherein the first end wall and the second end wall are each pivotally mounted to a base of the wagon.

18. A wagon, comprising:
a wall that is positionable in a use position and in a second position different from the use position, the wall at least partially defining a container;
a plurality of wheels;
a handle that is rotatable about at least one pivot point and that has a first locked position where an end of the handle that is distal from the at least one pivot point is proximate to a first end of the wagon and that has a second locked position where the end of the handle that is distal from the at least one pivot point is proximate to a second end of the wagon; and
a handle lock mechanism having an actuator, a cable, and a locking protrusion, wherein the actuator is coupled to the cable for actuating the locking protrusion between a locked position corresponding to the handle in the first locked position and the handle in the second locked position and a released position corresponding to the handle being rotatable about the at least one pivot point from the first locked position to the second locked position.

19. The wagon of claim 18, further comprising a footwell configured to extend below a bottom surface of the container.

20. The wagon of claim 19, wherein the footwell is positionable in an extended position and a storage position.

21. The wagon of claim 19, wherein the bottom surface further comprises at least one seating surface.

22. The wagon of claim 21, wherein the wall further defines a seat back which together with the at least one seating surface defines a seat for a child within the wagon.

23. A wagon, comprising:

a wall that is positionable in a use position and in a second position different from the use position, the wall at least partially defining a container, the container having a bottom surface;

a footwell located below the bottom surface of the container;

a plurality of wheels;

a handle that is rotatable about at least one pivot point and that has a first locked position and a second locked position, wherein when the handle is in the first locked position, an end of the handle that is distal from the at least one pivot point is proximate to a first end of the wagon; and a handle lock mechanism having an actuator and a locking protrusion, wherein the actuator is coupled to the locking protrusion, wherein the actuator is configured for moving the locking protrusion between a locked position corresponding to the handle in the first locked position or the handle in the second locked position and a released position corresponding to the handle being rotatable about the at least one pivot point from the first locked position to the second locked position, and wherein the actuator is positioned on the handle and is coupled to a cable extending along a length of the handle, wherein the cable is coupled to the locking protrusion, and wherein the looking protrusion is sized and shaped to engage with a plurality of notches for selectively positioning the handle in the first locked position or the second locked position.

24. The wagon of claim 23, wherein in the second locked position, the handle is substantially perpendicular to the bottom surface of the container.

25. The wagon of claim 23, wherein the locking protrusion is spring-biased in a locked position in which the locking protrusion is engaged with one of the plurality of notches.

26. The wagon of claim 25, wherein the locking protrusion is engaged with one notch of the plurality of notches when the handle is in the first locked position.

27. The wagon of claim 23, wherein the locking protrusion is positioned at an opposite end of the handle as the actuator.

28. The wagon of claim 23, wherein the locking protrusion is proximate to the at least one pivot point.

29. The wagon of claim 23, wherein the footwell is positionable in an extended position and a storage position.

30. The wagon of claim 23, wherein the bottom surface further comprises at least one seating surface.

31. The wagon of claim 30, wherein the wall further defines a seat back which together with the at least one seating surface defines a seat for a child within the wagon.

32. The wagon of claim 31, wherein in the second locked position, the handle does not contact the seat back.

33. The wagon of claim 31, wherein when the handle is in the second locked position and subjected to a load, the load is not transferred into the seat back.

34. The wagon of claim 23, wherein in the second locked position, the handle does not contact the wall.

35. The wagon of claim 23, wherein when the handle is in the second locked position and subjected to a load, the load is not transferred into the wall.

36. The wagon of claim 23, wherein the handle lock mechanism is configured to be manually actuated.

* * * * *